US012126596B2

(12) United States Patent
Newell et al.

(10) Patent No.: US 12,126,596 B2
(45) Date of Patent: *Oct. 22, 2024

(54) CONFIGURING NETWORK SECURITY BASED ON DEVICE MANAGEMENT CHARACTERISTICS

(71) Applicant: AirWatch LLC, Atlanta, GA (US)

(72) Inventors: Craig Farley Newell, Atlanta, GA (US); Sulay Shah, Atlanta, GA (US); Leung Tao Kwok, Cumming, GA (US); Adam Rykowski, Alpharetta, GA (US)

(73) Assignee: Omnissa, LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/676,427

(22) Filed: Feb. 21, 2022

(65) Prior Publication Data

US 2022/0174046 A1    Jun. 2, 2022

Related U.S. Application Data

(63) Continuation of application No. 15/012,185, filed on Feb. 1, 2016, now Pat. No. 11,290,425.

(51) Int. Cl.
*H04L 9/40* (2022.01)
*H04W 4/50* (2018.01)
(Continued)

(52) U.S. Cl.
CPC ........ *H04L 63/0272* (2013.01); *H04L 63/029* (2013.01); *H04W 4/50* (2018.02);
(Continued)

(58) Field of Classification Search
None
See application file for complete search history.

(56) References Cited

U.S. PATENT DOCUMENTS 5,903,732 A * 5/1999 Reed ............... H04L 63/102
                                                     709/229
6,330,560 B1 * 12/2001 Harrison ........... H04L 69/162
                                                     709/219
(Continued)

OTHER PUBLICATIONS

Mehmood et al "Mobile M2M communication Architectures, Upcoming Challenges, Applications, and Future Directions," EURASIP Journal on Wireless Communications and Networking, Springer, pp. 1-37 (Year: 2015).*

(Continued)

*Primary Examiner* — Luu T Pham
*Assistant Examiner* — James J Wilcox
(74) *Attorney, Agent, or Firm* — Kim & Stewart LLP

(57) ABSTRACT

Disclosed are various examples for configuring network security based on device management characteristics. In one example, a specification of a set of network resources on an internal network is received from an administrator client. The set of network resources are those network resources that a particular application executed in client devices on an external network should be authorized to access. A gateway from the external network to the internal network is then configured to permit the particular application to have access to the set of network resources.

14 Claims, 7 Drawing Sheets

(51) Int. Cl.
*H04W 12/082* (2021.01)
*H04W 12/084* (2021.01)
*H04W 12/088* (2021.01)

(52) U.S. Cl.
CPC ....... *H04W 12/082* (2021.01); *H04W 12/084* (2021.01); *H04W 12/088* (2021.01); *H04L 63/102* (2013.01)

(56) References Cited

U.S. PATENT DOCUMENTS

| | | | | |
|---|---|---|---|---|
| 6,339,595 B1* | 1/2002 | Rekhter | H04L 12/4645 | 370/392 |
| 6,360,102 B1* | 3/2002 | Havinis | H04W 12/08 | 455/433 |
| 6,466,932 B1 | 10/2002 | Dennis et al. | | |
| 6,496,979 B1* | 12/2002 | Chen | H04W 4/50 | 717/178 |
| 6,640,248 B1* | 10/2003 | Jorgensen | H04W 8/04 | 370/328 |
| 6,693,878 B1* | 2/2004 | Daruwalla | H04L 63/0272 | 370/395.31 |
| 6,704,282 B1* | 3/2004 | Sun | H04L 12/4641 | 370/237 |
| 6,765,881 B1* | 7/2004 | Rajakarunanayake | H04L 63/0272 | 370/254 |
| 7,039,033 B2* | 5/2006 | Haller | H04M 1/72406 | |
| 7,069,330 B1* | 6/2006 | McArdle | H04L 63/0227 | 709/227 |
| 7,373,660 B1* | 5/2008 | Guichard | H04L 63/0272 | 726/15 |
| 7,444,415 B1* | 10/2008 | Bazzinotti | H04L 67/303 | 709/227 |
| 7,546,633 B2* | 6/2009 | Garg | G06F 21/629 | 713/170 |
| 7,606,533 B2* | 10/2009 | Perttila | G01S 13/751 | 340/572.1 |
| 7,725,601 B2* | 5/2010 | Conzola | H04L 67/1001 | 707/634 |
| 7,779,461 B1* | 8/2010 | Liu | H04L 9/40 | 713/153 |
| 7,814,208 B2* | 10/2010 | Stephenson | H04L 63/061 | 709/227 |
| 7,840,701 B2* | 11/2010 | Hsu | H04L 61/2517 | 709/245 |
| 7,907,601 B2* | 3/2011 | Strathmeyer | H04L 65/1104 | 370/352 |
| 7,941,544 B2* | 5/2011 | Hayer | H04L 69/329 | 709/227 |
| 7,966,014 B1* | 6/2011 | Manroa | H04W 12/086 | 455/406 |
| 7,970,899 B2* | 6/2011 | Wiryaman | H04L 63/20 | 709/225 |
| 8,010,701 B2* | 8/2011 | Wilkinson | G06F 8/61 | 709/219 |
| 8,020,190 B2* | 9/2011 | Plummer | H04L 67/02 | 726/1 |
| 8,095,786 B1* | 1/2012 | Kshirsagar | H04L 63/0272 | 713/151 |
| 8,099,503 B2* | 1/2012 | Yeates | H04L 63/102 | 709/227 |
| 8,132,231 B2* | 3/2012 | Amies | H04L 63/102 | 726/4 |
| 8,181,238 B2* | 5/2012 | Holar | H04L 63/0209 | 713/168 |
| 8,200,790 B1* | 6/2012 | Reeves | G06F 8/60 | 709/220 |
| 8,219,598 B2* | 7/2012 | Appleton | H04L 63/102 | 707/824 |
| 8,244,672 B1* | 8/2012 | Thenthiruperai | H04W 4/50 | 707/621 |
| 8,249,081 B2* | 8/2012 | Chang | H04L 61/5014 | 370/395.3 |
| 8,274,917 B1* | 9/2012 | Bowman | H04L 63/102 | 370/254 |
| 8,301,767 B1* | 10/2012 | Davis | H04L 63/102 | 709/224 |
| 8,301,903 B2* | 10/2012 | MacFarlane | H04L 63/123 | 713/187 |
| 8,406,748 B2* | 3/2013 | Raleigh | H04L 41/5045 | 455/414.1 |
| 8,472,919 B1* | 6/2013 | Sivalingham | H04W 12/06 | 455/410 |
| 8,479,259 B2* | 7/2013 | Devine | H04L 41/0253 | 709/229 |
| 8,495,212 B2* | 7/2013 | Czyzewicz | H04L 63/102 | 709/225 |
| 8,504,061 B2* | 8/2013 | Grainger | H04W 4/20 | 455/412.2 |
| 8,510,466 B2* | 8/2013 | Goodman | H04L 65/102 | 709/238 |
| 8,560,699 B1 | 10/2013 | Theimer et al. | | |
| 8,566,452 B1* | 10/2013 | Goodwin, III | H04L 63/0281 | 709/227 |
| 8,589,541 B2* | 11/2013 | Raleigh | H04L 41/5054 | 709/224 |
| 8,615,794 B1* | 12/2013 | Tomilson | G06F 21/6218 | 713/185 |
| 8,731,529 B2* | 5/2014 | Lindeman | G06F 8/60 | 455/414.1 |
| 8,732,852 B2* | 5/2014 | Shu | H04L 63/10 | 726/28 |
| 8,744,348 B2* | 6/2014 | Fine | G06K 7/10237 | 455/418 |
| 8,769,629 B2* | 7/2014 | Shatzkamer | H04L 63/0236 | 713/153 |
| 8,804,504 B1* | 8/2014 | Chen | H04L 69/22 | 370/229 |
| 8,863,243 B1* | 10/2014 | Lidzborski | H04W 12/065 | 726/4 |
| 8,875,166 B2* | 10/2014 | Plewnia | G06F 21/335 | 725/5 |
| 8,887,230 B2 | 11/2014 | Barton et al. | | |
| 8,904,477 B2 | 12/2014 | Barton et al. | | |
| 8,935,766 B2* | 1/2015 | Tsirtsis | H04L 61/5076 | 726/4 |
| 8,990,886 B2* | 3/2015 | Lim | H04L 63/1425 | 726/1 |
| 8,990,900 B2* | 3/2015 | Edwards | H04L 63/104 | 726/4 |
| 9,002,342 B2* | 4/2015 | Tenhunen | H04W 4/50 | 455/418 |
| 9,003,391 B2* | 4/2015 | Oh | H04L 67/34 | 717/173 |
| 9,009,323 B1 | 4/2015 | Theimer et al. | | |
| 9,043,463 B1* | 5/2015 | Cohn | H04L 41/0816 | 709/225 |
| 9,049,047 B2* | 6/2015 | Jalan | H04L 12/4633 | |
| 9,124,629 B1* | 9/2015 | Bowen | H04L 63/045 | |
| 9,130,942 B2* | 9/2015 | Suryavanshi | H04L 67/10 | |
| 9,143,494 B2* | 9/2015 | Giles | H04L 63/08 | |
| 9,143,886 B2* | 9/2015 | Abou-El-Ella | H04W 4/50 | |
| 9,158,526 B1* | 10/2015 | Nguyen | G06F 8/65 | |
| 9,172,766 B2* | 10/2015 | Narasimhan | H04L 67/56 | |
| 9,219,736 B1* | 12/2015 | Lewis | H04L 67/53 | |
| 9,219,751 B1* | 12/2015 | Chen | H04W 12/084 | |
| 9,237,182 B1* | 1/2016 | Smus | H04W 4/80 | |
| 9,258,272 B1* | 2/2016 | Durand | H04L 63/30 | |
| 9,280,677 B1* | 3/2016 | Perry | H04L 67/10 | |
| 9,307,034 B1* | 4/2016 | Keyani | H04L 67/53 | |
| 9,336,500 B2* | 5/2016 | Lawson | H04L 63/102 | |
| 9,374,342 B2* | 6/2016 | Ormazabal | H04L 43/50 | |
| 9,386,403 B2* | 7/2016 | Ledru | G06Q 20/3278 | |
| 9,450,944 B1* | 9/2016 | Sousley | H04L 63/0807 | |
| 9,451,450 B2* | 9/2016 | Fleischman | H04W 4/50 | |
| 9,466,051 B1* | 10/2016 | Roth | G06F 21/6218 | |
| 9,473,460 B2* | 10/2016 | Vasters | H04L 67/02 | |
| 9,503,460 B2* | 11/2016 | Gladstone | H04L 63/0272 | |

(56) References Cited

U.S. PATENT DOCUMENTS

| | | | | |
|---|---|---|---|---|
| 9,503,890 B2* | 11/2016 | Norrman | | H04W 12/02 |
| 9,521,117 B2 | 12/2016 | Barton et al. | | |
| 9,560,038 B2* | 1/2017 | Gupta | | H04L 63/102 |
| 9,560,524 B1* | 1/2017 | Reeves | | H04W 12/06 |
| 9,591,434 B1* | 3/2017 | Cordes | | H04L 63/0272 |
| 9,602,501 B1* | 3/2017 | Ramalingam | | H04L 63/083 |
| 9,613,221 B1* | 4/2017 | Reed | | H04W 4/50 |
| 9,614,873 B1 | 4/2017 | Theimer et al. | | |
| 9,729,516 B2* | 8/2017 | Dolan | | H04L 63/0428 |
| 9,807,057 B1* | 10/2017 | Deb | | H04L 61/2514 |
| 9,858,583 B2* | 1/2018 | Sobalvarro | | H04W 4/80 |
| 9,906,838 B2* | 2/2018 | Cronk | | H04L 63/102 |
| 9,922,323 B2* | 3/2018 | Buhrmann | | G06Q 20/108 |
| 9,967,260 B1* | 5/2018 | Gabriel | | H04W 12/06 |
| 10,003,635 B1* | 6/2018 | Seibert, Jr. | | H04L 67/34 |
| 10,021,196 B1* | 7/2018 | Akers | | H04L 67/51 |
| 10,045,217 B2* | 8/2018 | Stan | | H04L 63/1408 |
| 10,057,267 B1* | 8/2018 | Miller | | H04L 63/102 |
| 10,114,960 B1* | 10/2018 | McClintock | | H04L 63/1408 |
| 10,225,324 B2* | 3/2019 | Tobita | | H04W 4/21 |
| 10,243,957 B1* | 3/2019 | Wasiq | | H04L 63/102 |
| 10,251,203 B2* | 4/2019 | Hamilton | | H04W 4/50 |
| 10,263,868 B1* | 4/2019 | Baldi | | H04W 12/02 |
| 10,313,853 B2* | 6/2019 | Takeuchi | | H04W 4/60 |
| 10,348,816 B2* | 7/2019 | Saheba | | H04L 67/1012 |
| 10,373,152 B2* | 8/2019 | Makhotin | | G06Q 20/327 |
| 10,397,073 B2* | 8/2019 | Pfeifer | | H04W 4/50 |
| 10,412,118 B1* | 9/2019 | Davis | | H04L 63/0209 |
| 10,440,095 B2* | 10/2019 | Zhou | | H04W 4/60 |
| 10,469,304 B1 | 11/2019 | Kempe et al. | | |
| 10,498,583 B1* | 12/2019 | Davis | | G06F 9/45558 |
| 10,523,636 B2* | 12/2019 | Newell | | H04W 12/37 |
| 10,868,696 B2* | 12/2020 | Al-Asaaed | | H04L 63/0272 |
| 11,647,414 B2* | 5/2023 | Wang | | H04W 4/50 370/230 |
| 2001/0011341 A1* | 8/2001 | Hayes, Jr. | | H04L 63/102 712/11 |
| 2001/0037384 A1* | 11/2001 | Jemes | | H04L 61/5061 709/238 |
| 2002/0023210 A1* | 2/2002 | Tuomenoksa | | H04L 63/0272 713/168 |
| 2002/0035639 A1* | 3/2002 | Xu | | H04L 67/10 709/230 |
| 2002/0035699 A1* | 3/2002 | Crosbie | | H04L 63/105 713/153 |
| 2002/0066029 A1* | 5/2002 | Yi | | H04L 63/0272 726/15 |
| 2002/0083342 A1* | 6/2002 | Webb | | G06F 21/31 709/217 |
| 2002/0093915 A1* | 7/2002 | Larson | | H04L 41/40 370/252 |
| 2002/0124082 A1* | 9/2002 | San Andres | | G06F 11/201 709/200 |
| 2002/0133534 A1* | 9/2002 | Forslow | | H04L 12/4641 709/200 |
| 2002/0184357 A1* | 12/2002 | Traversat | | H04L 61/00 709/223 |
| 2003/0009588 A1* | 1/2003 | Bodlaender | | H04L 12/2805 709/238 |
| 2003/0016672 A1* | 1/2003 | Rosen | | H04L 45/00 370/392 |
| 2003/0023587 A1 | 1/2003 | Dennis et al. | | |
| 2003/0028674 A1* | 2/2003 | Boden | | H04L 63/0227 709/224 |
| 2003/0035397 A1* | 2/2003 | Haller | | H04M 1/72412 370/353 |
| 2003/0060189 A1* | 3/2003 | Minear | | H04L 63/12 455/560 |
| 2003/0120601 A1* | 6/2003 | Ouye | | H04L 63/105 705/51 |
| 2003/0149787 A1* | 8/2003 | Mangan | | H04L 63/0272 709/249 |
| 2003/0163728 A1* | 8/2003 | Shaw | | H04L 63/0272 726/12 |
| 2003/0177221 A1 | 9/2003 | Ould-Brahim et al. | | |
| 2003/0226012 A1* | 12/2003 | Asokan | | G06F 21/10 380/277 |
| 2004/0003290 A1* | 1/2004 | Malcolm | | H04L 63/0263 726/28 |
| 2004/0005873 A1* | 1/2004 | Groenendaal | | H04W 12/122 455/410 |
| 2004/0081129 A1* | 4/2004 | Haller | | G06F 9/44526 370/328 |
| 2004/0093595 A1 | 5/2004 | Bilange | | |
| 2004/0111461 A1* | 6/2004 | Claudatos | | H04L 69/32 709/200 |
| 2004/0127190 A1* | 7/2004 | Hansson | | H04W 4/50 455/418 |
| 2004/0160903 A1 | 8/2004 | Gai et al. | | |
| 2004/0177157 A1* | 9/2004 | Mistry | | H04L 12/4641 709/241 |
| 2004/0193909 A1* | 9/2004 | Chang | | G06F 21/6236 726/14 |
| 2004/0203681 A1 | 10/2004 | Ross et al. | | |
| 2004/0215799 A1* | 10/2004 | Lehmann, Jr. | | H04L 65/611 709/230 |
| 2004/0230646 A1* | 11/2004 | Clough | | G06F 3/1226 709/203 |
| 2004/0249935 A1* | 12/2004 | Jackson | | G06F 11/3006 709/224 |
| 2004/0249958 A1* | 12/2004 | Ozdemir | | H04L 63/029 709/229 |
| 2004/0266420 A1* | 12/2004 | Malinen | | H04L 63/0209 455/421 |
| 2004/0268124 A1* | 12/2004 | Narayanan | | H04L 63/102 713/164 |
| 2005/0055578 A1* | 3/2005 | Wright | | G06F 21/32 726/4 |
| 2005/0088977 A1* | 4/2005 | Roch | | H04L 47/31 370/254 |
| 2005/0120214 A1* | 6/2005 | Yeates | | H04L 63/08 713/171 |
| 2005/0129019 A1 | 6/2005 | Cheriton | | |
| 2005/0138204 A1 | 6/2005 | Iyer et al. | | |
| 2005/0184164 A1* | 8/2005 | de Jong | | G06F 21/74 235/492 |
| 2005/0257209 A1* | 11/2005 | Adams | | G06F 21/629 717/174 |
| 2005/0265308 A1* | 12/2005 | Barbir | | H04L 12/4641 370/351 |
| 2006/0007903 A1* | 1/2006 | Hammell | | H04L 63/0272 370/342 |
| 2006/0013191 A1 | 1/2006 | Kavanagh | | |
| 2006/0015738 A1* | 1/2006 | Hallensleben | | H04L 63/0815 713/182 |
| 2006/0072583 A1* | 4/2006 | Sanda | | H04L 47/24 370/395.53 |
| 2006/0075478 A1* | 4/2006 | Hyndman | | H04L 63/029 726/11 |
| 2006/0153122 A1* | 7/2006 | Hinman | | H04L 67/04 370/328 |
| 2006/0167858 A1 | 7/2006 | Dennis et al. | | |
| 2006/0174121 A1 | 8/2006 | Omae et al. | | |
| 2006/0184999 A1 | 8/2006 | Guichard et al. | | |
| 2006/0198368 A1 | 9/2006 | Guichard et al. | | |
| 2006/0203774 A1* | 9/2006 | Carrion-Rodrigo | | H04W 12/03 370/331 |
| 2006/0206934 A1* | 9/2006 | Ammirata | | H04L 63/0272 726/15 |
| 2006/0212924 A1 | 9/2006 | Kie et al. | | |
| 2006/0245414 A1* | 11/2006 | Susai | | H04L 63/0272 370/352 |
| 2007/0004393 A1* | 1/2007 | Forsberg | | H04W 4/50 455/420 |
| 2007/0011450 A1* | 1/2007 | McCreight | | H04L 63/102 713/165 |
| 2007/0016637 A1* | 1/2007 | Brawn | | H04L 47/2441 709/200 |

(56) References Cited

U.S. PATENT DOCUMENTS

| | | | |
|---|---|---|---|
| 2007/0043940 A1* | 2/2007 | Gustave | H04L 63/0471 713/150 |
| 2007/0055783 A1* | 3/2007 | Gourraud | H04L 65/1104 709/227 |
| 2007/0086462 A1* | 4/2007 | Zhang | H04L 63/029 370/392 |
| 2007/0107043 A1* | 5/2007 | Newstadt | H04L 63/102 726/2 |
| 2007/0117548 A1* | 5/2007 | Fernandez-Alonso | H04L 63/0236 455/414.1 |
| 2007/0133763 A1* | 6/2007 | D'Angelo | H04W 12/08 379/93.02 |
| 2007/0186009 A1* | 8/2007 | Guichard | H04L 47/125 709/238 |
| 2007/0208857 A1* | 9/2007 | Danner | H04L 63/102 709/226 |
| 2007/0244966 A1* | 10/2007 | Stoyanov | H04L 45/00 709/204 |
| 2007/0271606 A1* | 11/2007 | Amann | H04W 12/02 726/15 |
| 2007/0283430 A1* | 12/2007 | Lai | H04L 63/108 726/15 |
| 2007/0288280 A1* | 12/2007 | Gilbert | G06F 21/554 705/80 |
| 2008/0028206 A1* | 1/2008 | Sicard | H04L 63/0407 713/156 |
| 2008/0034419 A1* | 2/2008 | Mullick | H04L 63/102 726/15 |
| 2008/0040775 A1 | 2/2008 | Hoff et al. | |
| 2008/0046994 A1* | 2/2008 | Venkatraman | H04L 63/0272 726/15 |
| 2008/0057904 A1* | 3/2008 | Pousti | H04W 4/50 455/406 |
| 2008/0057923 A1* | 3/2008 | Pousti | H04W 12/082 455/414.3 |
| 2008/0072033 A1 | 3/2008 | McAlister | |
| 2008/0072307 A1* | 3/2008 | Maes | H04L 67/56 726/12 |
| 2008/0080509 A1* | 4/2008 | Khanna | H04L 63/0272 370/392 |
| 2008/0113649 A1* | 5/2008 | Ibacache | H04L 9/00 455/410 |
| 2008/0127327 A1 | 5/2008 | Carrasco | |
| 2008/0148357 A1* | 6/2008 | Chen | H04L 63/02 713/182 |
| 2008/0271137 A1* | 10/2008 | Sinn | H04L 12/4633 726/15 |
| 2008/0275995 A1* | 11/2008 | Soliman | H04L 41/12 726/28 |
| 2008/0276085 A1* | 11/2008 | Davidson | H04L 63/20 713/161 |
| 2009/0031042 A1* | 1/2009 | Phatak | H04L 61/4511 709/245 |
| 2009/0061890 A1* | 3/2009 | Andreasson | H04W 4/021 455/456.1 |
| 2009/0070412 A1* | 3/2009 | D'Angelo | H04L 67/146 709/203 |
| 2009/0093260 A1* | 4/2009 | Ziskind | H04W 4/02 455/456.3 |
| 2009/0144818 A1* | 6/2009 | Kumar | H04L 63/0272 726/13 |
| 2009/0150972 A1* | 6/2009 | Moon | H04L 67/1076 709/202 |
| 2009/0158420 A1* | 6/2009 | Ks | H04L 67/131 726/15 |
| 2009/0217350 A1* | 8/2009 | Manning | H04L 61/5014 726/3 |
| 2009/0240654 A1* | 9/2009 | Limber | G06F 21/6218 |
| 2009/0241170 A1* | 9/2009 | Kumar | H04L 47/2458 370/235 |
| 2009/0259759 A1* | 10/2009 | Miyajima | G06F 9/45558 718/1 |
| 2009/0298495 A1* | 12/2009 | Zhu | H04L 67/306 455/433 |
| 2009/0300350 A1 | 12/2009 | Gai et al. | |
| 2009/0319611 A1* | 12/2009 | Turakhia | H04L 12/1822 709/204 |
| 2010/0011432 A1* | 1/2010 | Edery | H04L 63/205 726/1 |
| 2010/0023600 A1* | 1/2010 | Hill | H04L 41/0859 709/217 |
| 2010/0037311 A1* | 2/2010 | He | H04L 63/20 709/227 |
| 2010/0054204 A1* | 3/2010 | Dolganow | H04L 69/22 370/331 |
| 2010/0125897 A1* | 5/2010 | Jain | H04L 63/0272 713/193 |
| 2010/0138650 A1 | 6/2010 | Kang et al. | |
| 2010/0180037 A1* | 7/2010 | Dessart | H04L 63/0272 709/227 |
| 2010/0192170 A1* | 7/2010 | Raleigh | H04L 47/2408 725/1 |
| 2010/0199325 A1* | 8/2010 | Raleigh | H04W 12/06 726/3 |
| 2010/0240398 A1* | 9/2010 | Hotes | H04W 12/084 455/456.2 |
| 2010/0293610 A1 | 11/2010 | Beachem et al. | |
| 2010/0319051 A1* | 12/2010 | Bafna | H04L 63/108 726/4 |
| 2011/0002346 A1* | 1/2011 | Wu | H04L 67/561 370/474 |
| 2011/0010701 A1* | 1/2011 | Cooper | G06F 21/12 717/176 |
| 2011/0040870 A1* | 2/2011 | Wynn | H04L 63/08 709/224 |
| 2011/0065417 A1* | 3/2011 | McDonald | H04L 67/63 455/410 |
| 2011/0099230 A1* | 4/2011 | Inapakolla | H04L 67/34 709/206 |
| 2011/0105154 A1* | 5/2011 | Kim | H04W 4/50 455/458 |
| 2011/0110377 A1* | 5/2011 | Alkhatib | H04L 61/2503 370/395.53 |
| 2011/0119751 A1* | 5/2011 | Richardson | H04L 63/029 726/2 |
| 2011/0137817 A1* | 6/2011 | Roumeliotis | H04L 63/102 705/325 |
| 2011/0154471 A1* | 6/2011 | Anderson | G06F 21/41 726/11 |
| 2011/0154473 A1* | 6/2011 | Anderson | H04L 63/1483 726/11 |
| 2011/0196731 A1* | 8/2011 | Christie | G06Q 30/0225 726/6 |
| 2011/0213980 A1* | 9/2011 | Surace | G06F 21/6218 713/171 |
| 2011/0230211 A1* | 9/2011 | Kim | H04W 48/08 455/456.4 |
| 2011/0231851 A1* | 9/2011 | Lategan | G06F 3/0482 718/102 |
| 2011/0250875 A1* | 10/2011 | Huang | H04W 4/026 455/418 |
| 2011/0263196 A1* | 10/2011 | Saros | H04L 63/102 455/3.01 |
| 2011/0264777 A1* | 10/2011 | Tibbett | H04L 63/102 709/223 |
| 2011/0289172 A1* | 11/2011 | Marcellino | H04W 4/20 709/206 |
| 2012/0036282 A1* | 2/2012 | Chen | H04L 63/0428 235/492 |
| 2012/0066745 A1* | 3/2012 | Wuthnow | H04L 63/10 726/4 |
| 2012/0071152 A1* | 3/2012 | Roundtree | H04W 4/60 455/419 |
| 2012/0078998 A1* | 3/2012 | Son | H04L 61/4511 709/203 |

(56) References Cited

U.S. PATENT DOCUMENTS

| | | | |
|---|---|---|---|
| 2012/0084466 A1* | 4/2012 | Brown | H04L 65/756 709/248 |
| 2012/0088487 A1* | 4/2012 | Khan | H04W 4/18 455/418 |
| 2012/0117620 A1 | 5/2012 | Cassidy et al. | |
| 2012/0131326 A1* | 5/2012 | Lau | H04L 63/104 726/4 |
| 2012/0131643 A1 | 5/2012 | Cheriton | |
| 2012/0144452 A1* | 6/2012 | Dyor | H04L 63/0884 726/4 |
| 2012/0158829 A1* | 6/2012 | Ahmavaara | H04L 63/20 709/203 |
| 2012/0159388 A1* | 6/2012 | Chalouhi | G06F 16/435 715/810 |
| 2012/0167162 A1* | 6/2012 | Raleigh | H04W 12/069 726/1 |
| 2012/0174189 A1* | 7/2012 | Lim | G06F 21/88 726/26 |
| 2012/0184259 A1* | 7/2012 | Lee | H04L 69/24 455/418 |
| 2012/0185912 A1* | 7/2012 | Lee | H04L 63/10 726/4 |
| 2012/0191847 A1* | 7/2012 | Nas | H04L 63/0263 709/224 |
| 2012/0210442 A1* | 8/2012 | Ito | G06F 21/121 726/26 |
| 2012/0216292 A1* | 8/2012 | Richardson | H04W 4/60 726/27 |
| 2012/0227093 A1* | 9/2012 | Shatzkamer | H04L 63/102 726/4 |
| 2012/0240211 A1* | 9/2012 | Counterman | H04L 63/0853 726/9 |
| 2012/0250845 A1* | 10/2012 | Hillier | H04M 3/42068 379/142.05 |
| 2012/0254608 A1* | 10/2012 | Ho | H04L 45/38 713/153 |
| 2012/0260215 A1* | 10/2012 | Fennel | H04W 4/50 715/825 |
| 2012/0317261 A1* | 12/2012 | Ahmavaara | H04L 67/141 709/223 |
| 2012/0327945 A1* | 12/2012 | Li | H04W 4/70 370/401 |
| 2013/0036213 A1* | 2/2013 | Hasan | H04L 63/0272 709/223 |
| 2013/0042244 A1* | 2/2013 | Li | H04L 67/34 718/100 |
| 2013/0064255 A1* | 3/2013 | Saavedra | H04L 45/245 370/536 |
| 2013/0066976 A1* | 3/2013 | Massey | H04W 4/50 709/206 |
| 2013/0078946 A1* | 3/2013 | Pecen | H04L 63/123 455/411 |
| 2013/0078948 A1* | 3/2013 | Pecen | H04L 63/123 455/411 |
| 2013/0107706 A1* | 5/2013 | Raleigh | H04W 28/24 370/230 |
| 2013/0111541 A1* | 5/2013 | Yin | H04W 12/08 726/1 |
| 2013/0117430 A1* | 5/2013 | Wallis | H04L 63/102 709/223 |
| 2013/0117851 A1* | 5/2013 | Bhagwat | H04L 43/00 726/23 |
| 2013/0133043 A1* | 5/2013 | Barkie | H04L 63/0485 726/4 |
| 2013/0133061 A1* | 5/2013 | Fainkichen | G06F 9/45558 726/15 |
| 2013/0144793 A1* | 6/2013 | Royston | G06Q 20/3278 705/72 |
| 2013/0171963 A1* | 7/2013 | Stougaard | H04W 12/08 455/410 |
| 2013/0173736 A1* | 7/2013 | Krzeminski | H04W 12/086 709/213 |
| 2013/0191929 A1* | 7/2013 | Yin | H04L 63/102 726/28 |
| 2013/0203465 A1* | 8/2013 | Ali | H04L 65/1073 455/558 |
| 2013/0204971 A1* | 8/2013 | Brandwine | H04L 41/0803 709/217 |
| 2013/0210418 A1* | 8/2013 | Cannon | H04W 4/50 455/420 |
| 2013/0215793 A1* | 8/2013 | Cutler | H04L 63/102 370/259 |
| 2013/0227118 A1* | 8/2013 | Simen | H04W 4/50 709/224 |
| 2013/0254833 A1* | 9/2013 | Nicodemus | G06F 21/577 726/1 |
| 2013/0254849 A1* | 9/2013 | Alison | H04L 63/123 726/4 |
| 2013/0268999 A1* | 10/2013 | Kiang | H04L 67/1095 726/4 |
| 2013/0272193 A1* | 10/2013 | Wu | H04W 4/38 370/328 |
| 2013/0303088 A1* | 11/2013 | Watfa | H04W 4/80 455/41.2 |
| 2013/0304881 A1* | 11/2013 | Venkatraman | H04L 63/102 709/220 |
| 2013/0311766 A1* | 11/2013 | Lortz | H04L 63/164 713/151 |
| 2013/0324097 A1* | 12/2013 | Roberts | H04L 67/34 455/418 |
| 2013/0331063 A1* | 12/2013 | Cormier | H04L 63/0853 455/411 |
| 2013/0332363 A1* | 12/2013 | Renard | H04W 12/47 705/44 |
| 2013/0332518 A1* | 12/2013 | Chor | H04L 67/563 709/203 |
| 2014/0007162 A1* | 1/2014 | Harrison | H04L 67/02 725/35 |
| 2014/0007192 A1* | 1/2014 | Qureshi | H04W 12/30 726/3 |
| 2014/0011476 A1* | 1/2014 | Krefft | H04W 4/50 455/457 |
| 2014/0032705 A1* | 1/2014 | Williams | H04W 12/08 709/217 |
| 2014/0035727 A1* | 2/2014 | Nguyen | H04L 67/51 340/10.1 |
| 2014/0074931 A1* | 3/2014 | Bouvet | H04W 4/60 709/204 |
| 2014/0082056 A1* | 3/2014 | Gargiulo | H04W 12/35 709/203 |
| 2014/0082088 A1* | 3/2014 | Ye | G06Q 50/01 709/204 |
| 2014/0108084 A1* | 4/2014 | Bargetzi | H04M 3/565 705/7.19 |
| 2014/0108793 A1 | 4/2014 | Barton et al. | |
| 2014/0109168 A1* | 4/2014 | Ashley | H04L 63/20 726/1 |
| 2014/0109174 A1 | 4/2014 | Barton et al. | |
| 2014/0109175 A1 | 4/2014 | Barton et al. | |
| 2014/0109176 A1 | 4/2014 | Barton et al. | |
| 2014/0109214 A1 | 4/2014 | Siu | |
| 2014/0115025 A1* | 4/2014 | Taoka | H04L 67/10 709/201 |
| 2014/0123269 A1* | 5/2014 | Drihem | H04L 63/0272 726/11 |
| 2014/0137235 A1* | 5/2014 | Horton | H04L 9/3231 726/20 |
| 2014/0148205 A1* | 5/2014 | Grinshpun | H04L 63/029 455/466 |
| 2014/0150049 A1 | 5/2014 | Kwon et al. | |
| 2014/0155022 A1* | 6/2014 | Kandregula | H04W 4/50 455/405 |
| 2014/0155048 A1* | 6/2014 | Zawaideh | H04W 8/22 455/418 |
| 2014/0162614 A1 | 6/2014 | Lindeman et al. | |
| 2014/0173700 A1 | 6/2014 | Awan et al. | |
| 2014/0206310 A1* | 7/2014 | Bluestein | H04W 12/08 455/411 |

(56) References Cited

U.S. PATENT DOCUMENTS

| | | | |
|---|---|---|---|
| 2014/0207623 A1* | 7/2014 | Novick | H04M 15/43 705/26.81 |
| 2014/0207869 A1* | 7/2014 | Savolainen | G06F 9/4843 709/204 |
| 2014/0208295 A1* | 7/2014 | Yang | G06F 8/36 717/120 |
| 2014/0228001 A1* | 8/2014 | Kulkarni | G06F 21/629 455/411 |
| 2014/0233564 A1 | 8/2014 | Lue et al. | |
| 2014/0250492 A1* | 9/2014 | Cooper | H04L 63/20 726/1 |
| 2014/0258367 A1* | 9/2014 | Suryavanshi | H04W 4/50 709/203 |
| 2014/0280896 A1* | 9/2014 | Papakostas | H04W 4/50 709/224 |
| 2014/0298428 A1* | 10/2014 | Qu | H04L 63/102 726/5 |
| 2014/0304393 A1* | 10/2014 | Annamalaisami | G06F 11/3495 709/224 |
| 2014/0307896 A1* | 10/2014 | Park | H04W 4/60 381/119 |
| 2014/0310779 A1* | 10/2014 | Lof | H04L 63/0421 726/4 |
| 2014/0337525 A1* | 11/2014 | Branton | H04L 67/34 709/225 |
| 2014/0351344 A1* | 11/2014 | Wu | H04L 67/34 709/204 |
| 2014/0359721 A1* | 12/2014 | Alphin, III | G06F 3/0482 707/758 |
| 2014/0359746 A1* | 12/2014 | Tezuka | H04L 63/0876 726/9 |
| 2014/0364058 A1* | 12/2014 | Chew | G06Q 20/3278 455/41.1 |
| 2014/0364100 A1* | 12/2014 | Marti | H04W 4/029 455/418 |
| 2014/0366120 A1* | 12/2014 | Wood | H04L 63/10 726/15 |
| 2014/0373170 A1* | 12/2014 | Brudnicki | G06F 21/604 726/27 |
| 2014/0375439 A1* | 12/2014 | Rezvani | G06Q 20/3672 340/12.28 |
| 2014/0376452 A1* | 12/2014 | Li | H04L 67/55 370/328 |
| 2014/0378122 A1* | 12/2014 | Schultz | H04W 4/08 455/420 |
| 2015/0012998 A1 | 1/2015 | Nellikar et al. | |
| 2015/0020214 A1* | 1/2015 | Copsey | H04W 12/084 726/27 |
| 2015/0026477 A1* | 1/2015 | Malatack | H04L 63/123 713/176 |
| 2015/0032887 A1* | 1/2015 | Pesek | H04W 12/08 709/224 |
| 2015/0058916 A1* | 2/2015 | Rostami-Hesarsorkh | H04L 63/168 726/1 |
| 2015/0079968 A1* | 3/2015 | Wang | H04W 8/24 455/419 |
| 2015/0081837 A1* | 3/2015 | Bernier | H04W 4/80 709/217 |
| 2015/0087288 A1* | 3/2015 | Dharawat | G06F 3/04817 455/419 |
| 2015/0089597 A1* | 3/2015 | Srinivasan | H04L 63/08 726/4 |
| 2015/0113113 A1* | 4/2015 | Yang | H04W 4/70 709/223 |
| 2015/0118994 A1* | 4/2015 | Shin | H04W 12/02 455/410 |
| 2015/0127708 A1* | 5/2015 | Quinlan | H04L 67/01 709/201 |
| 2015/0142947 A1* | 5/2015 | Dyba | H04W 4/24 709/224 |
| 2015/0142986 A1* | 5/2015 | Reznik | H04L 69/24 709/228 |
| 2015/0154389 A1* | 6/2015 | Hotes | H04L 9/3213 726/4 |
| 2015/0156061 A1* | 6/2015 | Saxena | H04L 67/34 715/733 |
| 2015/0163215 A1* | 6/2015 | Qin | H04L 63/08 726/6 |
| 2015/0172920 A1 | 6/2015 | Ben | |
| 2015/0205947 A1* | 7/2015 | Berman | A61B 5/14532 726/16 |
| 2015/0263865 A1* | 9/2015 | Rangarajan | H04L 12/4633 370/254 |
| 2015/0263886 A1* | 9/2015 | Wang | H04L 41/12 370/254 |
| 2015/0264019 A1* | 9/2015 | Carroll | H04L 67/06 726/26 |
| 2015/0264634 A1* | 9/2015 | Ding | H04W 4/70 455/434 |
| 2015/0264659 A1* | 9/2015 | Starsinic | H04W 60/04 455/435.1 |
| 2015/0278363 A1* | 10/2015 | Briere | G06F 16/986 707/710 |
| 2015/0281198 A1* | 10/2015 | Lee | H04W 8/18 726/7 |
| 2015/0281322 A1 | 10/2015 | Dingwell et al. | |
| 2015/0293756 A1* | 10/2015 | Wright | G06F 21/53 718/1 |
| 2015/0295890 A1* | 10/2015 | Qin | H04L 65/1066 709/227 |
| 2015/0295930 A1* | 10/2015 | Dixon | H04L 63/0807 713/181 |
| 2015/0304354 A1* | 10/2015 | Rogers | H04L 63/0236 726/1 |
| 2015/0304440 A1* | 10/2015 | Zheng | H04L 67/55 717/177 |
| 2015/0327071 A1* | 11/2015 | Sharma | H04W 12/12 726/6 |
| 2015/0339463 A1* | 11/2015 | Cardamore | H04L 63/10 726/4 |
| 2015/0339464 A1* | 11/2015 | Kode | G06F 21/31 726/18 |
| 2015/0350219 A1* | 12/2015 | Selander | H04W 8/205 726/4 |
| 2015/0350916 A1* | 12/2015 | Selander | H04W 8/18 455/411 |
| 2015/0365381 A1* | 12/2015 | Durbin | H04L 63/0272 726/15 |
| 2015/0365512 A1 | 12/2015 | Mackenzie et al. | |
| 2015/0373027 A1* | 12/2015 | Gupta | H04W 12/088 726/4 |
| 2016/0014131 A1* | 1/2016 | Neafsey | H04W 12/082 713/171 |
| 2016/0026777 A1* | 1/2016 | Ito | G06F 21/608 726/29 |
| 2016/0057031 A1* | 2/2016 | Gedam | H04L 61/2517 709/224 |
| 2016/0066186 A1* | 3/2016 | Kim | H04M 15/66 455/406 |
| 2016/0072823 A1* | 3/2016 | Faccin | H04W 12/08 726/1 |
| 2016/0085521 A1* | 3/2016 | Savliwala | G06F 8/36 717/108 |
| 2016/0087854 A1 | 3/2016 | Jayanti et al. | |
| 2016/0088480 A1* | 3/2016 | Chen | H04W 12/50 709/229 |
| 2016/0099941 A1* | 4/2016 | Hein | H04L 63/0876 726/4 |
| 2016/0100272 A1* | 4/2016 | Tsurutome | H04W 4/50 455/419 |
| 2016/0105420 A1* | 4/2016 | Engan | H04W 12/068 455/411 |
| 2016/0119343 A1* | 4/2016 | Salmela | H04W 4/70 726/7 |
| 2016/0127343 A1* | 5/2016 | Schiller | H04L 63/0807 726/9 |

(56) References Cited

U.S. PATENT DOCUMENTS

| | | | |
|---|---|---|---|
| 2016/0127348 A1* | 5/2016 | Bradley | H04L 9/3213 |
| | | | 713/168 |
| 2016/0134613 A1* | 5/2016 | Rong | H04L 63/08 |
| | | | 726/7 |
| 2016/0150094 A1* | 5/2016 | Mandanapu | H04M 15/59 |
| | | | 455/406 |
| 2016/0182567 A1 | 6/2016 | Sood et al. | |
| 2016/0192277 A1* | 6/2016 | Starsinic | H04W 12/088 |
| | | | 370/329 |
| 2016/0196134 A1* | 7/2016 | Holtmanns | H04L 63/0428 |
| | | | 717/172 |
| 2016/0196432 A1* | 7/2016 | Main | H04W 12/08 |
| | | | 726/1 |
| 2016/0226828 A1* | 8/2016 | Bone | H04L 67/01 |
| 2016/0227471 A1* | 8/2016 | De Foy | H04W 48/18 |
| 2016/0248682 A1* | 8/2016 | Lee | H04L 67/146 |
| 2016/0277359 A1 | 9/2016 | Karunakaran et al. | |
| 2016/0277368 A1* | 9/2016 | Narayanaswamy | |
| | | | G06F 21/6209 |
| 2016/0285875 A1* | 9/2016 | Lenz | H04L 63/10 |
| 2016/0301699 A1* | 10/2016 | Wang | G06F 8/61 |
| 2016/0315910 A1* | 10/2016 | Kaufman | H04L 61/4511 |
| 2016/0337104 A1* | 11/2016 | Kalligudd | H04L 12/4641 |
| 2016/0366145 A1* | 12/2016 | Raghavendra | H04L 63/102 |
| 2017/0026383 A1* | 1/2017 | Hayton | H04W 12/086 |
| 2017/0034216 A1* | 2/2017 | Santhiveeran | H04L 63/08 |
| 2017/0063928 A1* | 3/2017 | Jain | G06F 16/9024 |
| 2017/0064040 A1* | 3/2017 | Rykowski | H04L 12/4625 |
| 2017/0064749 A1 | 3/2017 | Jain et al. | |
| 2017/0076265 A1* | 3/2017 | Royyuru | G06Q 20/18 |
| 2017/0078320 A1* | 3/2017 | Hughes | H04L 63/1433 |
| 2017/0104755 A1 | 4/2017 | Arregoces et al. | |
| 2017/0111336 A1* | 4/2017 | Davis | H04L 63/029 |
| 2017/0118173 A1 | 4/2017 | Arramreddy et al. | |
| 2017/0127216 A1* | 5/2017 | Coyne | H04W 4/50 |
| 2017/0149827 A1* | 5/2017 | Sims | H04L 63/102 |
| 2017/0150332 A1* | 5/2017 | Palanisamy | H04W 4/70 |
| 2017/0171186 A1 | 6/2017 | Purushothaman et al. | |
| 2017/0180351 A1* | 6/2017 | Lu | H04L 67/146 |
| 2017/0201491 A1 | 7/2017 | Schmidt et al. | |
| 2017/0201588 A1 | 7/2017 | Schmidt et al. | |
| 2017/0222977 A1* | 8/2017 | Newell | H04L 63/0272 |
| 2017/0235967 A1* | 8/2017 | Ray | G06F 21/56 |
| | | | 713/165 |
| 2017/0300708 A1* | 10/2017 | Gopshtein | H04L 63/0823 |
| 2017/0303077 A1* | 10/2017 | Li | H04W 4/50 |
| 2017/0351478 A1* | 12/2017 | Shan | G06F 9/452 |
| 2018/0184361 A1* | 6/2018 | Henry | H04W 4/50 |
| 2019/0028475 A1* | 1/2019 | Back | H04W 28/0268 |
| 2020/0205016 A1* | 6/2020 | Scott | H04W 48/18 |
| 2023/0328005 A1* | 10/2023 | VanDuyn | H04L 12/46 |
| | | | 709/226 |

OTHER PUBLICATIONS

Sun "The Advantages and the Implementation of SSL VPN," IEEE, pp. 548-551 (Year: 2011).*

Ibanez et al "Security Management with Virtual Gateway Platforms," 2009 Third International Conference on Emerging Security Information, Systems and Technologies, IEEE Computer Society, pp. 70-75 (Year: 2009).*

Yanqin et al "Design and Optimization of VPN Security Gateway," IEEE, pp. 1-4 (Year: 2006).*

Li, "Design and Implementation of VPN Security Gateway Based on Linux Kernel 2.6," Proceedings of 2009 4th International Conference on Computer Science & Education, IEEE, pp. 357-360 (Year: 2009).*

Han et al "The Design of Secure Embedded VPN Gateway," 2014 IEEE Workshop on Advanced Research and Technology in Industry Applications (WARTIA), IEEE, pp. 350-353 (Year: 2014).*

Fajardo et al "New Tunneling Capabilities for BGP/MPLS IP VPN in GNU/Linux," Seventh International Conference on Networking, IEEE Computer Society, pp. 324-329 (Year: 2008).

* cited by examiner

CONFIGURING NETWORK SECURITY BASED ON DEVICE MANAGEMENT CHARACTERISTICS

CROSS-REFERENCE TO RELATED APPLICATIONS

The application is continuation of and claims the benefit of U.S. patent application Ser. No. 15/012,185, entitled "CONFIGURING NETWORK SECURITY BASED ON DEVICE MANAGEMENT CHARACTERISTICS" and filed on Feb. 1, 2016, which is hereby incorporated by reference in its entirety.

BACKGROUND

Most users are now familiar with the concept of an application catalog, which can be referred to as an "app store." When users wish to install an application, their first thought is to access a program or web site corresponding to an "app store." An application catalog is a centralized interface through which users can browse information about various applications and easily launch downloads and installations of selected applications. Application catalogs are typically administered by a single organization, which can establish rules and security procedures to be followed in order for developers to participate. This central administration can provide a level of trustworthiness and comfort for users who are installing applications. In many cases, application catalogs are integrated with a shared payment workflow of the administering organization to simplify payments for applications. While popularized beginning with smartphones and tablets, application catalogs are increasingly relied upon for distributing applications for desktop and laptop computers as well.

In addition to the familiar application catalogs that are made available to the general public, organizations can provide private application catalogs for their employees or members. For example, an organization can choose to include only applications that have met security screening guidelines for use within the computer network of the organization. The application catalog can also manage application licensing for the organization. Rather than the user paying for a specific download of an application as is the case with public application catalogs, a private application catalog can track installations to comply with site licensing requirements or other previously negotiated licensing contracts. Such private application catalogs can be made available for devices managed through mobile device management (MDM). Such devices can be owned by the organization or the users themselves in a bring-your-own-device (BYOD) environment.

One issue with allowing a user to download an application from a private application catalog is that a user typically receives access to all resources on the network. For example, a large corporation can include multiple sales organizations focused on different products or geographic regions. The corporation can provide a sales application to its sales employees to track sales for their product or region. However, all of the sales employees who download the application typically would receive access to all sales documents regardless of that particular user's responsibilities, which can expose sensitive corporation information throughout the organization. Traditional approaches to restricting access, such as an administrator setting permissions for every user on every document or creating different custom applications for each corporate group, cannot scale to organizations with many employees and large numbers of documents and resources.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
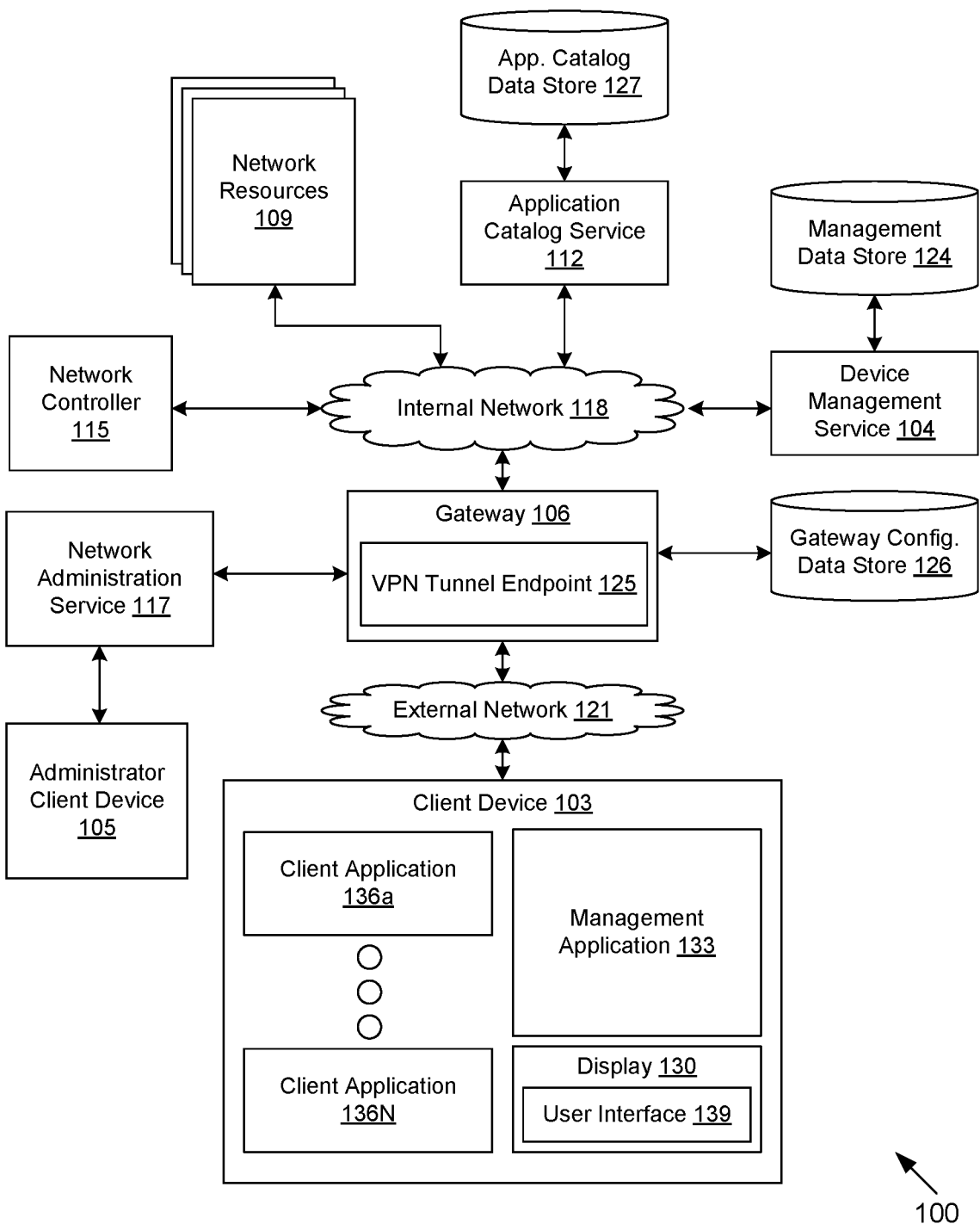
FIG. 1 is a drawing of a networked environment according to various examples of the disclosure.

The present disclosure relates to configuring security for a network on a per-application basis based on device management characteristics. As will be described, network resources on an organization's internal network can be grouped into a variety of security groups. Access to the network resources in a particular security group can be conditioned based on several factors. For example, different applications can be given access to different security groups. Thus, the identity of a particular application can be a factor in providing access to the network resources in a particular security group. Other device management attributes, such as a location of a client device, a user of the client device, an operating system of the client device, a jailbreak status of the client device, can also be used to grant or deny access to a particular security group.

One approach to implementing security groups in an organization's network uses micro-segmentation of the network. A microsegment can correspond to a virtual network where resource permissions are enforced by adding a resource to the microsegment or removing a resource from the microsegment. For example, a spreadsheet containing last quarter's sales data for the organization can be included in a microsegment accessible by management users but not in a microsegment accessible by customer service users. The microsegment security model either replaces or functions in concert with security models that manage access at each resource. A separate network microsegment can, in some examples, be created for at least every grouping of network resources that are to be accessed.

Client applications can be executed on client devices that are not physically coupled to the internal network of the organization. These client devices can be mobile devices owned by the user. In order to provide access to network resources of the organization, the organization can require that the client devices be managed by the organization. Through a device management platform, network traffic between a client application and network resources of the organization can be routed through a virtual private network (VPN) tunnel to a gateway to the internal network.

In various examples of the present disclosure, this gateway or tunnel endpoint can be configured to enforce various rules to permit or deny access to network resources and/or security groups. The rules can be based on the particular application and/or other device management attributes. In some examples, the gateway can assign a network address meeting certain predefined criteria to a tunnel endpoint corresponding to a particular application. The internal network is configured to permit the network address to access network resources in a security group. Conversely, if the application and/or other device management attributes do not meet the predefined criteria, the gateway can assign a different network address meeting different predefined criteria to the tunnel endpoint. This can allow access to an error message or other default network resource.

With reference to FIG. 1, shown is a networked environment 100 according to various examples. The networked environment 100 includes a client device 103, a device management service 104, an administrator client device 105, a gateway 106, a plurality of network resources 109, an application catalog service 112, a network controller 115, a network administration service 117, an internal network 118, and an external network 121. The gateway 106, the device management service 104, the application catalog service 112, the network resources 109, the network controller 115, and the network administration service 117 can be coupled to the internal network 118, while the gateway 106 and the client device 103 can be coupled to the external network 121. The administrator client device 105 can be in data communication with the network administration service 117 by way of the internal network 118 or through another network. Each of the internal network 118 and the external network 121 can include, for example, wide area networks (WANs), local area networks (LANs), wired networks, wireless networks, other suitable networks, or any combination of two or more networks. For example, the networks can include satellite networks, cable networks, Ethernet networks, and other types of networks.

The device management service 104, the gateway 106, the network resources 109, the application catalog service 112, the network controller 115, and the network administration service 117 can include, for example, a server computer, a network device, or any other system providing computing capabilities. Alternatively, the device management service 104, the gateway 106, the network resources 109, the application catalog service 112, the network controller 115, and the network administration service 117 can employ multiple computing devices that can be arranged, for example, in one or more server banks, computer banks, or other arrangements. The computing devices can be located in a single installation or can be distributed among many different geographical locations. For example, the device management service 104, the gateway 106, the network resources 109, the application catalog service 112, the network controller 115, and the network administration service 117 can include multiple computing devices that together form a hosted computing resource, a grid computing resource, or any other distributed computing arrangement.

In some cases, the device management service 104, the gateway 106, the network resources 109, the application catalog service 112, the network controller 115, and the network administration service 117 can operate as at least a portion of an elastic computing resource where the allotted capacity of processing, network, storage, or other computing-related resources can vary over time. The device management service 104, the gateway 106, the network resources 109, the application catalog service 112, the network controller 115, and the network administration service 117 can also include or be operated as one or more virtualized computer instances. Generally, the device management service 104, the gateway 106, the network resources 109, the application catalog service 112, the network controller 115, and the network administration service 117 can be operated in accordance with particular security protocols such that they are considered trusted computing environments. The device management service 104, the gateway 106, the network resources 109, the application catalog service 112, the network controller 115, and the network administration service 117 can be located remotely with respect to the client device 103.

The device management service 104 can manage or oversee the operation of multiple client devices 103. In some examples, an enterprise, such as one or more companies or other organizations, can operate the device management service 104 to oversee or manage the operation of the client devices 103 of employees, contractors, or other users within an enterprise environment. In this sense, the client devices 103 can include managed devices that are managed by the device management service 104.

The client device 103 can be enrolled as a managed device with the device management service 104 through APIs provided by the operating system. The enrollment process can include authentication of a user's credentials. Upon authentication of a user's credentials by the device management service 104, the client device 103, using device management APIs of the operating system, can enroll the client device 103 as a managed device so that various management functions can be performed by the device management service 104.

Examples of management functions can include commands to erase certain data from the client device 103, commands to install certain applications or application updates, commands to lock a client device 103 or activate a display lock feature, a command to remotely perform a factory reset of the client device 103, or other management functions. Additionally, data can be securely transmitted through a secure communications channel to the client device 103 or applications executed by the client device 103.

Additionally, the operating system of the client device 103 can also provide the ability to create access-restricted storage that is associated with particular applications installed on the client device 103. Access-restricted storage can be associated with multiple applications that are installed on the client device 103 through the secure communications channel. In some scenarios, applications that are signed by a common certificate can be provided access to the access-restricted storage of each other, whereas applications that are not signed by the certificate do not have access to the access-restricted storage of other applications. Additionally, the device management service 104 can transmit data to the client device 103 over the secure communications channel that can be stored in the access-restricted storage such that it is accessible by certain applications and inaccessible to other applications that are installed on the client device 103.

The device management service 104 can also facilitate ensuring that client devices 103 that are administered by the device management service 104 are operating in compliance with various compliance rules. In one scenario, the device management service 104 can issue management commands that instruct a client device 103 to take a particular action with respect to a compliance rule. For example, if a client device 103 is designated as lost or stolen, the device management service 104 can issue a command instructing the client device 103 to erase data and applications that were previously sent to the client device 103 through the secure communications channel or other communication links and otherwise stored on the client device 103. The device management service 104 can also obtain data from a third party computing environment, such as an application, a security code, authentication token, or other data. As another example, if the device management service 104 determines that a client device 103 has violated a compliance rule with respect to having unauthorized modifications or unauthorized applications installed on the client device 103, the device management service 104 can issue a command instructing the client device 103 to erase data and applications stored on the client device 103. As a further example, the device management service 104 can also issue a command instructing the client device 103 to activate a display lock of the client device 103 that requires a user to enter a personal identification number (PIN) in order to use the client device 103.

The data stored in the management data store 124 and available to the device management service 104 includes, for example, authentication data, compliance rules, device data, and potentially other data. The authentication data can include data used to verify one or more security credentials presented by a user for authentication. To this end, secure certificates can be stored and then be made available to the client device 103 that has been authenticated in order to encrypt the secure communications channel and/or for other functions.

Within the context of an enterprise, compliance rules include one or more rules that, when violated, can cause the device management service 104 to issue a management command. Compliance rules can include a list of unauthorized hardware functions, software functions, or applications that potentially pose a threat to enterprise data or to the use of enterprise applications. As noted above, if client device 103 falls out of compliance with one or more compliance rules, a management command can be transmitted to the client device 103 instructing the client device 103 to perform one or more actions specified by the compliance rule. Alternatively, a compliance rule can also reside on the client device 103, which can self-enforce compliance rules. The management data store 124 can also include user account data. User account data can include information with which a user account can be authenticated, such as user credentials. User account data can also include data such as email, contact, calendar data, documents, files or other data that is associated with a user account.

Device data can represent data stored in the management data store 124 that is associated with client devices 103 that are enrolled with the device management service 104 as managed devices. Device data can include a unique device identifier associated with the client device 103, device policies that are associated with a particular client device 103, status information associated with a particular client device 103, and other data that facilitates management of the client device 103 by the device management service 104. Device data can also include user data that is synchronized with a particular client device 103. A user account can be associated with multiple client devices 103. Different client devices 103 associated with a user account can have different user account data stored thereon. For example, a user's smartphone can have a certain number of documents or email messages stored on the device, whereas the user's laptop or tablet can have varying amounts of types of user account data stored on the device.

The gateway 106 establishes network tunnels with client devices 103 through the external network 121 in order to provide the client devices 103 with a secure connection to the network resources 109 coupled to the internal network 118. In other words, the gateway 106 restricts the access of the client device 103 to devices coupled to the internal network 118 by requiring the client device 103 to first establish a secure tunnel with the gateway 106. The secure tunnels can terminate at a virtual private network (VPN) tunnel endpoint 125 of the gateway 106. A tunnel uses a tunnel header to encapsulate the packets from one type of protocol in the datagram of a different protocol. Tunnels in some examples use point-to-point tunneling protocol (PPTP) to encapsulate internet protocol (IP) packets over a public network, such as the Internet. A tunnel encrypts the payload of its packets with one or more keys or secure certificates. This allows packets to be exchanged between the client device 103 and the gateway 106 securely. In some examples, the gateway 106 (1) encapsulates and encrypts packets sent from the internal network 118 to the client device 103 with a tunnel packet header, and (2) decapsulates tunnel headers from the packets that it receives from the client device 103, and decrypts these packets, before forwarding the packets to network elements of the internal network 118.

When a client device 103 tries to establish a tunnel connection with the gateway 106, the gateway 106 in some examples passes the credential set that it gets from the client device 103 to the device management service 104 in order to authenticate the request. In authenticating the credential set, the device management service 104 in some examples provides one or more mobile device management (MDM) attributes for the client device 103, the user (of the client device 103), and/or the application (executing on the client device 103) requesting the connection.

The gateway 106 associates the provided MDM attribute (s) with the data messages that it subsequently received from the client device 103 through the established connection. Also, once the connection is established, the client device 103 embeds one or more MDM attributes for the data messages that it sends in the tunnel header in some embodiments. In some examples, the gateway 106 aggregates the MDM attributes that it receives from the device management service 104 and the client device 103 into one set of MDM attributes that it associates with the data messages transmitted by the client device 103 through its connection.

Based on the associated MDM attribute set, the gateway 106 performs one or more operations on the data messages that it receives from the client device 103 through the tunnel. The associated MDM attribute set provides the context for processing the data processing rules that the gateway 106 enforces in some examples. In some examples, the rule identifiers of the rules are not only defined by reference to MDM attribute values but also by the flow identifier values (e.g., the L2-L4 header values) of the data message flows.

In one example, the gateway 106, as configured by data in the gateway configuration data store 126, assigns a network address meeting predefined criteria (e.g., within a certain subnetwork) based on the associated MDM attribute set. The assigned network address can be permitted access to certain network resources 109 on a micro-segment of the internal network 118. As an example, the gateway 106 can assign an internet protocol (IP) address in the range "10.123.1.x" to a VPN tunnel endpoint 125 to enable the VPN tunnel endpoint 125 to communicate with network resources 109 corresponding to sales department servers. As another example, the gateway 106 can assign an IP address in the range "10.124.1.x" to a VPN tunnel endpoint 125 to enable the VPN tunnel endpoint 125 to communicate with network resources 109 corresponding to accounting department servers.

The network resources 109 provide corresponding services for client applications. The services can include, for example, social networking services, email services, voice communication services, enterprise information management services, productivity services, game services, databases, and other services. The network resources 109 can communicate with the client device 103 over the external network 121 and the internal network 118 by way of hypertext transfer protocol (HTTP), simple object access protocol (SOAP), representational state transfer (REST), and/or other protocols.

The application catalog service 112 is executed to provide application catalog functionality to client devices 103. In particular, the application catalog service 112 is configured to generate a listing of applications that are available to be deployed (e.g., installed, configured) to client devices 103 that are managed by the organization. In this regard, the application catalog service 112 can encode one or more user interfaces that present the application catalog for rendering on the client device 103. Data relating to these user interfaces can be transferred to the client device 103 over the external network 121. For example, the data can correspond to a hypertext markup language (HTML) code, images, extensible markup language (XML) code, JavaScript object notation (JSON) data, yet another markup language (YAML) data, or other user interface data.

The application catalog service 112 can be aware of distinct security groups within the organization. Security groups can allow access to particular subsets of network resources 109 while denying access to other network resources 109. The security groups can, for example, correspond to roles of a user within the organization. When the application is deployed on the client device 103, the application is able to access network resources 109 in a selected or specified security group, but not other network resources 109 of the internal network 118. In another example, the system can automatically detect a user's security group based on information identifying the user or the user's device. For example, the MDM attributes used when accessing an application catalog can also be used to look up a user's assigned security group within the management data store 124. In one scenario, multiple instances of a particular application can be featured in a listing of applications in the application catalog, where each of the instances can correspond to a different security group.

The data stored in the application catalog data store 127 and available to the application catalog service 112 includes application packages for deployment to the client devices 103, configuration data that indicates the available security groups (or roles within the organizations) on a per-application basis, and potentially other data.

The network controller 115 is executed to control the gateway 106 and elements within the internal network 118 (e.g., firewalls, routers, bridges, intrusion detection systems, network address translation systems, port address translation systems) in order to implement virtual network segments within the internal network 118 for applications of the client device 103 to access a particular set of network resources 109. A virtual network segment, or micro-segment, can be established for each set of network resources 109 such that network traffic from a VPN tunnel endpoint 125 is routable in the internal network 118 only to an approved set of network resources 109 and not to other network resources 109. A given network resource 109 can accessible through a plurality of different virtual network segments.

The network administration service 117 can facilitate configuration of the operation of the gateway 106, the application catalog service 112, the network controller 115, and other services by the administrator client device 105. To this end, the network administration service 117 can cause a series of user interfaces to be rendered by the administrator client device 105. The user interfaces can correspond to a web portal rendered by a browser or to native application screens rendered by a native application executed in the administrator client device 105. For example, the network administration service 117 can provide an application programming interface (API) for communication with a native application executed in the administrator client device 105. The administrator client device 105 can represent a processor-based system, such as a computer system, that can be embodied in the form of a desktop computer, a laptop computer, a personal digital assistant, a cellular telephone, a smartphone, a set-top box, a music player, a web pad, a tablet computer system, a game console, an electronic book reader, or any other device with like capability.

Figure 2:
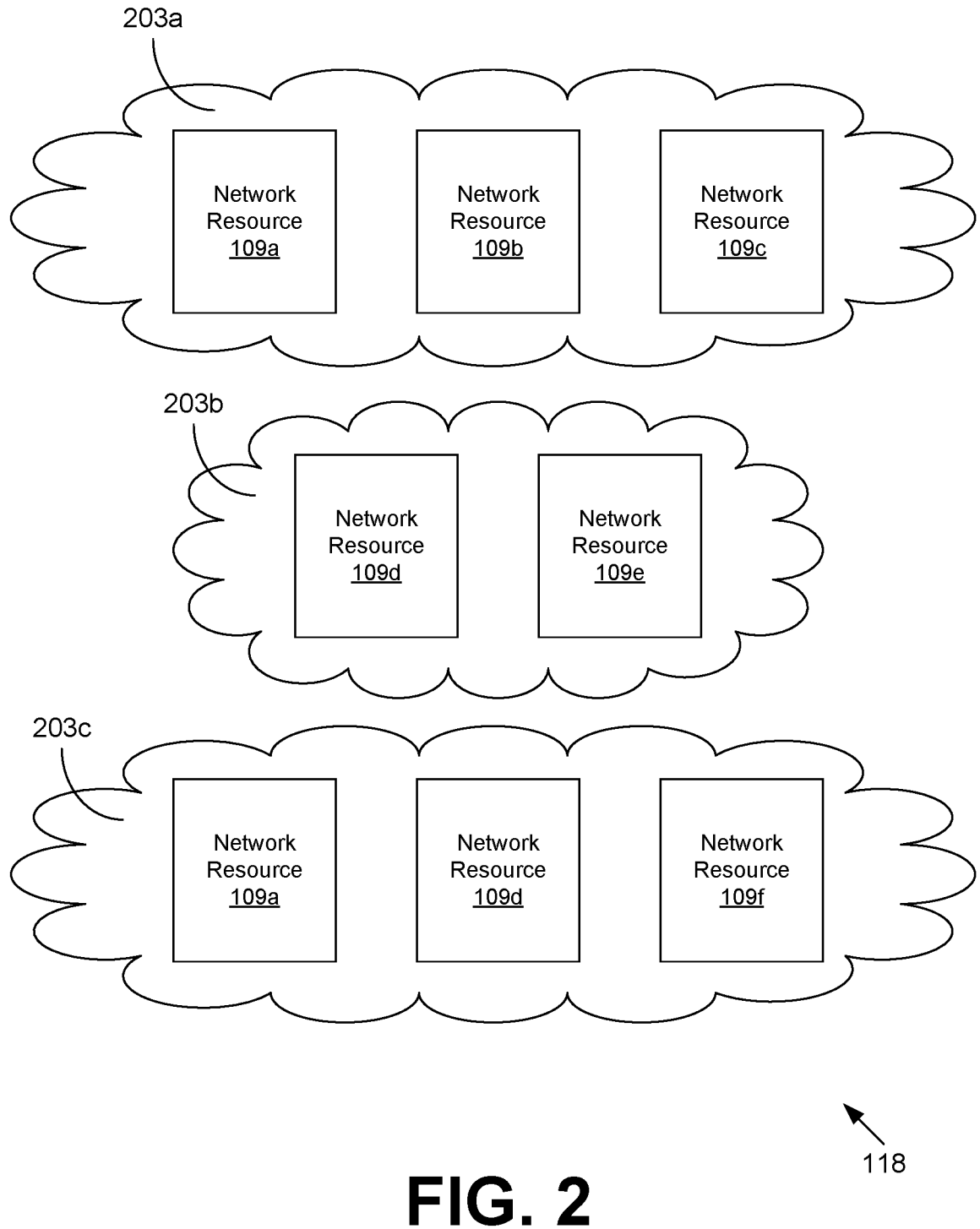
FIG. 2 is a drawing of an example of an internal network with multiple virtual network segments, which can each be associated with different security groups.

Referring now to FIG. 2, shown is one example of an internal network 118 with multiple virtual network segments 203a, 203b, 203c, which can each be associated with different security groups. In this example, the virtual network segment 203a includes network resource 109a, network resource 109b, and network resource 109c. Virtual network segment 203b includes network resources 109d and 109e. Virtual network segment 203c includes network resources 109a, 109d, and 109f. It is noted that the network resource 109a is accessible through multiple virtual network segments 203a and 203c. Similarly, the network resource 109d is accessible through virtual network segments 203b and 203c. This illustrates that a different combination of resources can be made available through individual virtual network segments 203. Examples of network resources 109 can include links to file repositories or portions thereof, particular servers, particular accounts on a server, particular virtual machines or particular data stored by a virtual machine, and particular computing devices.

Referring back to FIG. 1, the client device 103 can represent a processor-based system, such as a computer system, that can be embodied in the form of a desktop computer, a laptop computer, a personal digital assistant, a cellular telephone, a smartphone, a set-top box, a music player, a web pad, a tablet computer system, a game console, an electronic book reader, or any other device with like capability. The client device 103 can include a display 130 that includes, for example, one or more devices such as liquid crystal display (LCD) displays or other types of display devices. The client device 103 can also be equipped with networking capability or networking interfaces, including a localized networking or communication capability such as a near-field communication (NFC) capability, radio-frequency identifier (RFID) read and/or write capability, a microphone and/or speaker, or other localized communication capability.

The client device 103 can execute various applications, such as a management application 133, a plurality of client applications 136a . . . 136N, and other applications, services, or processes. The management application 133 can receive security credentials from a user and authenticate with the device management service 104. Although described as an application, it is understood that the management application 133 can be an integral component of an operating system of the client device 103. The client applications 136 correspond to a variety of applications that are employed to access services provided by the network resources 109. The client applications 136 can include a web view component, whereby the client applications 136 interact with the network resources 109 to obtain network content by way of hypertext transfer protocol (HTTP) requests and responses. Alternatively, the client applications 136 can communicate with the network resources 109 using user datagram protocol (UDP), real-time transport protocol (RTP), and/or other protocols. The client applications 136 and the management application 133 can individually render a respective user interface 139 upon the display 130.

Figure 3:
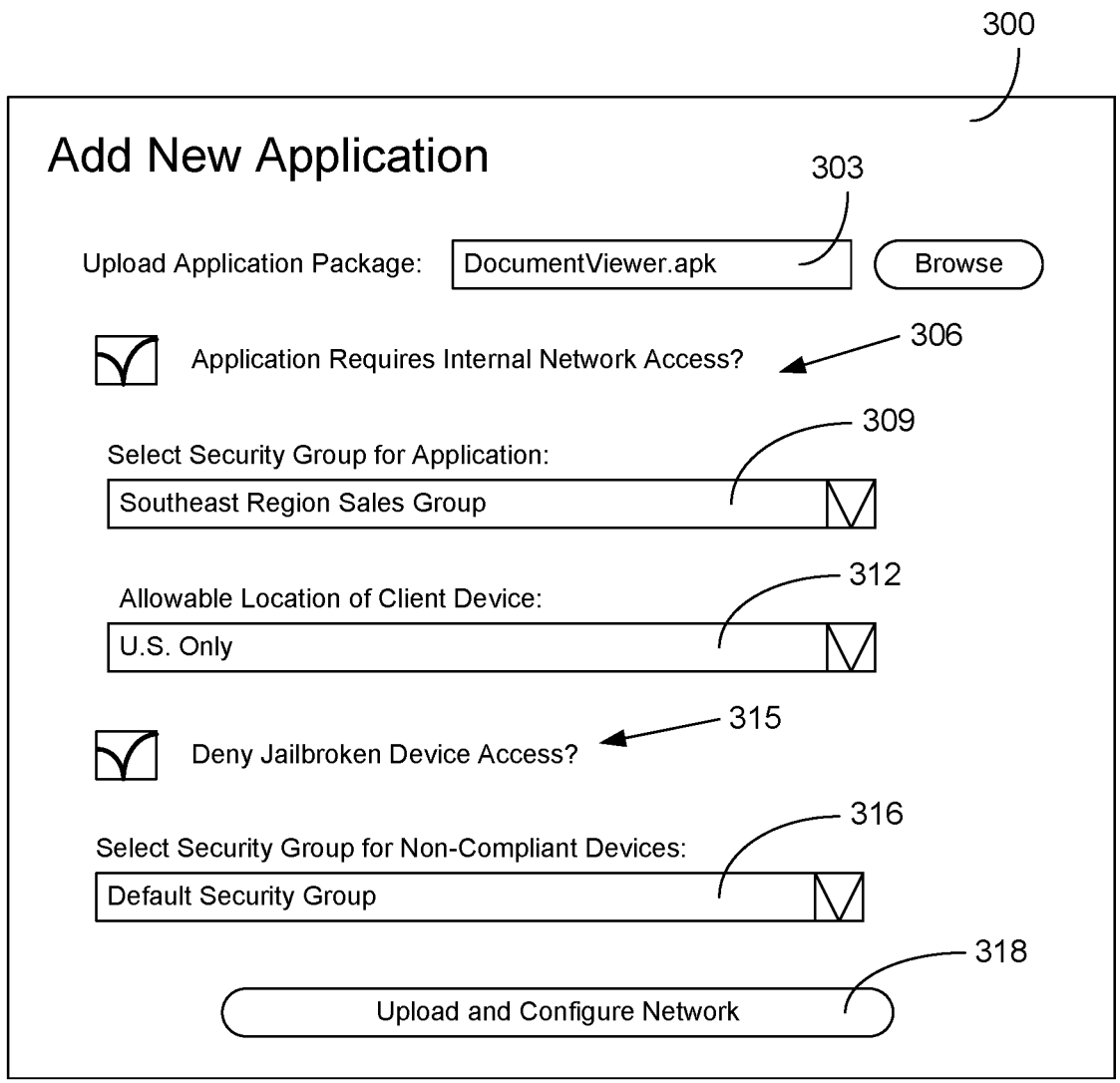
FIG. 3 is a drawing of an example user interface rendered by an administrator client device in the networked environment of FIG. 1.

Continuing now to FIG. 3, shown is one example of a user interface 300 rendered by an administrator client device 105 in the networked environment 100 (FIG. 1). The user interface 300 facilitates configuration of a client application 136 to be added to an application catalog served by an application catalog service 112. The user interface 300 can be generated by the network administration service 117, and data encoding the user interface 300 can be sent to the administrator client device 105 for rendering.

The user interface 300 includes one or more application upload components 303 that allow an administrator user to specify a given application package to be uploaded, downloaded, or otherwise imported to the application catalog. For example, an administrator user can navigate to a local file on the administrator client device 105 corresponding to an application package (e.g., "DocumentViewer.apk") using a file picker, and then upload the package to the network administration service 117. Alternatively, the administrator user can specify a uniform resource locator (URL) indicating an internal or external location of the application package. In some examples, the user can specify additional information about the application package, such as title, version, unique identifier, and/or other metadata. In some cases, this metadata can be extracted from the application package itself.

The user interface 300 can include a selection component 306 such as a checkbox that allows the administrator user to indicate whether the client application 136 should be permitted to have access to the internal network 118. If the client application 136 should not be permitted to have access to the internal network 118, further configuration for network security purposes can be unnecessary. However, if the client application 136 is to be permitted access to the internal network 118, a selection component 309 such as a drop-down box can allow the administrator user to specify one or more security groups (or microsegments or virtual network segments) to which the client application 136 will have access. In this example, the security group of "Southeast Region Sales Group" is selected, and this security group can correspond to a predefined set of network resources 109 to which the client application 136 should have access.

The user interface 300 can also include a selection component 312 such as a drop-down box that allows the administrator user to specify one or more allowable locations (or restricted locations) of the client device 103 for permitting or denying network access to the client application 136 based on the location of the client device 103. For example, the administrator user can specify that the client application 136 should have access to network resources 109 of the security group within the United States only. Alternatively, the administrator user can specify that the client application 136 cannot have access to the network resources 109 of the security group when the client device 103 is within a certain country.

The user interface 300 can also include a selection component 315 such as a checkbox that, when selected, denies client devices 103 that are jailbroken or rooted from having access to the network resources 109 of the security group. Although the user interface 300 includes components allowing specification of locations and jailbreak status, it is understood that user interfaces 300 can include any number of user interface components that facilitate specification of rule-based criteria to allow or deny network access based on MDM attributes, such as user identity, device identity, operating system version, application version, and other attributes.

The user interface 300 can also include a selection component 316 such as a drop-down box that allows an administrator user to specify a fallback or default security group of network resources 109 to which the client application 136 should have access if the client device 103 is in a non-compliant state relative to the MDM attributes. For example, if a client device 103 is jailbroken, and jailbroken devices are not permitted access to network resources 109 of a particular security group, the jailbroken client device 103 can still access a default network resource 109 in order to provide an error message or document through the client application 136. This can improve the end-user experience as compared to being unable to make a network connection. Finally, a submit component 318 such as a button can be provided in the user interface 300 such that, when the submit component 318 is selected, the application package can be transferred and the network administration service 117 can receive the network configuration parameters specified by the administrator user.

Figure 4:
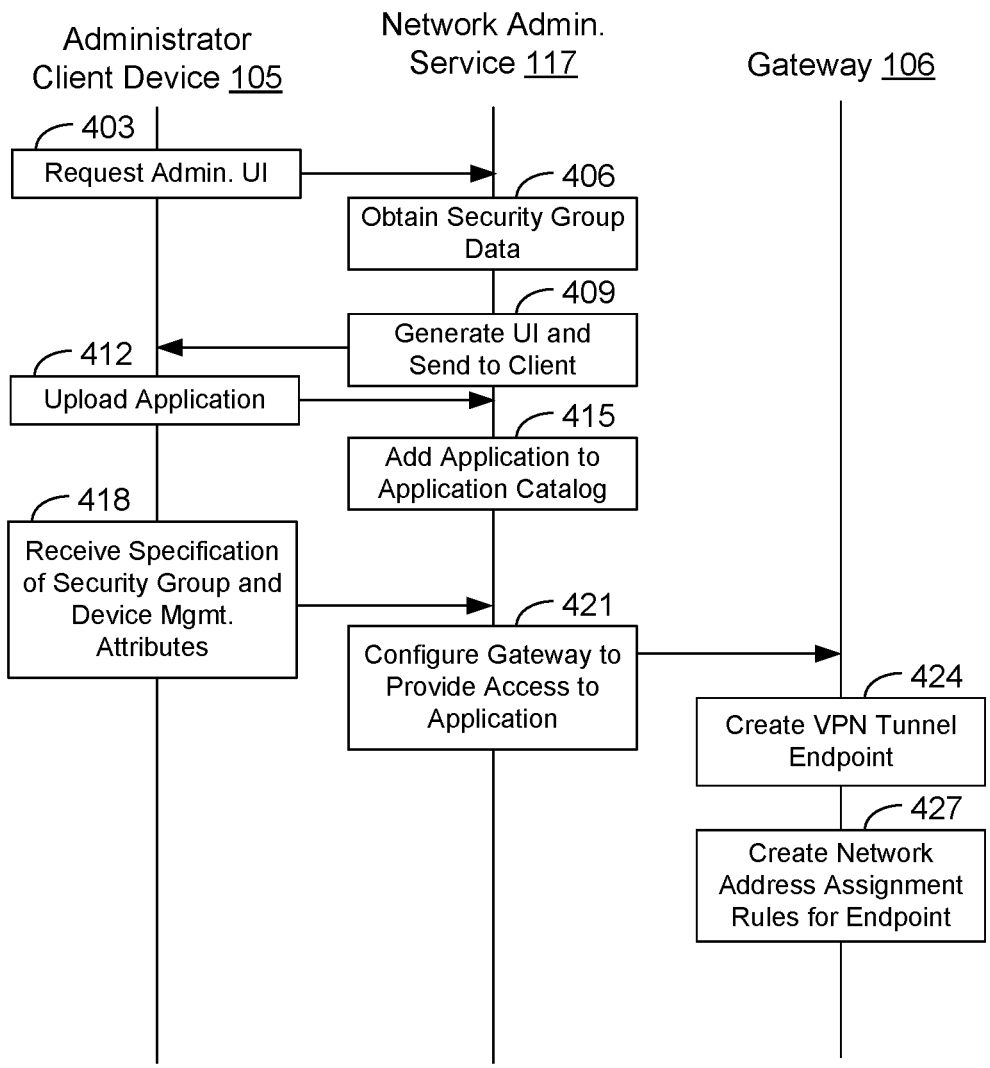
FIGS. 4 and 5 are sequence diagrams illustrating example component interactions according to various examples of the present disclosure.

Moving on FIG. 4, shown is a sequence diagram 400 illustrating one example of interaction between an administrator client device 105, a network administration service 117, and a gateway 106. Functionality attributed to each of the administrator client device 105, the network administration service 117, or the gateway 106 can be implemented in fewer processes or application or in additional processes or applications. The separation or segmentation of functionality as discussed herein is presented for illustrative purposes only.

Beginning with step 403, the administrator client device 105 requests an administration user interface from the network administration service 117 in order to manage the application catalog and/or network security on the internal network 118. At step 406, the network administration service 117 obtains security group data from a data store (e.g., the gateway configuration data store 126). For example, the internal network 118 can be preconfigured with a number of micro-segments, or sets of network resources 109 on separate virtual network segments. Each of these virtual network segments can be said to correspond to a separate security group. In some cases, a separate security group can be established for each grouping of roles within an organization. The security group data can include a mapping of security groups to predefined network address ranges or network address selection criteria.

At step 409, the network administration service 117 generates the user interface and sends data encoding the user interface to the administrator client device 105. For example, the data encoding the user interface can take the form of hypertext markup language (HTML), extensible markup language (XML), user interface image data, or other data. The user interface 300 of FIG. 3 corresponds to an exemplary administration user interface.

At step 412, the administrator client device 105 uploads an application package for a client application 136 to the network administration service 117. Alternatively, the administrator client device 105 can provide a uniform resource locator (URL) from which the application package can be obtained. At step 415, the network administration service 117 adds the client application 136 to the application catalog. The network administration service 117 can store the application package directly in the application catalog data store 127, or the network administration service 117 can cause the application catalog service 112 to import the application package into the application catalog. Although uploading of a client application 136 is discussed with respect to steps 412 and 415, in some scenarios the client application 136 can already be deployed on the client devices 103.

At step 418, the administrator client device 105 receives a specification of a security group and/or other device management attributes from an administrator user through the user interface. That is to say, the administrator user can select a security group corresponding to a set of network resources 109 to which the client application 136 should have access. In addition, the administration user can specify device management attributes that are required in order for the access to the set of network resources 109 to be authorized. These attributes can include, for example, location of the client device 103, identity of the user, identity of the client device 103, application version, operating system version, jailbreak status, and other attributes. These configuration parameters are then sent to the network administration service 117.

At step 421, the network administration service 117 then configures the gateway 106 to provide the specified network access to the client application 136. In this regard, configuration settings in the gateway configuration data store 126 can be updated. Also, the network administration service 117 can cause the gateway 106 to perform various configuration functions relating to network address assignment. At step 424, the gateway 106 creates a VPN tunnel endpoint 125 for the client application 136.

At step 427, the gateway 106 creates network address assignment rules for the VPN tunnel endpoint 125. In particular, the gateway 106 determines a particular network address or predefined criteria for assigning network addresses that would enable the client application 136 to access the specified security group. Further, the gateway 106 creates rules that permit or deny access to the specified security group based on the MDM attributes of the client device 103 meeting or not meeting predefined criteria. In addition, a particular network address or predefined criteria for assigning network addresses that would enable the client application 136 to access a specified default network resource 109 can be determined for situations in which the client device 103 is non-compliant with respect to the MDM attributes.

Figure 5:
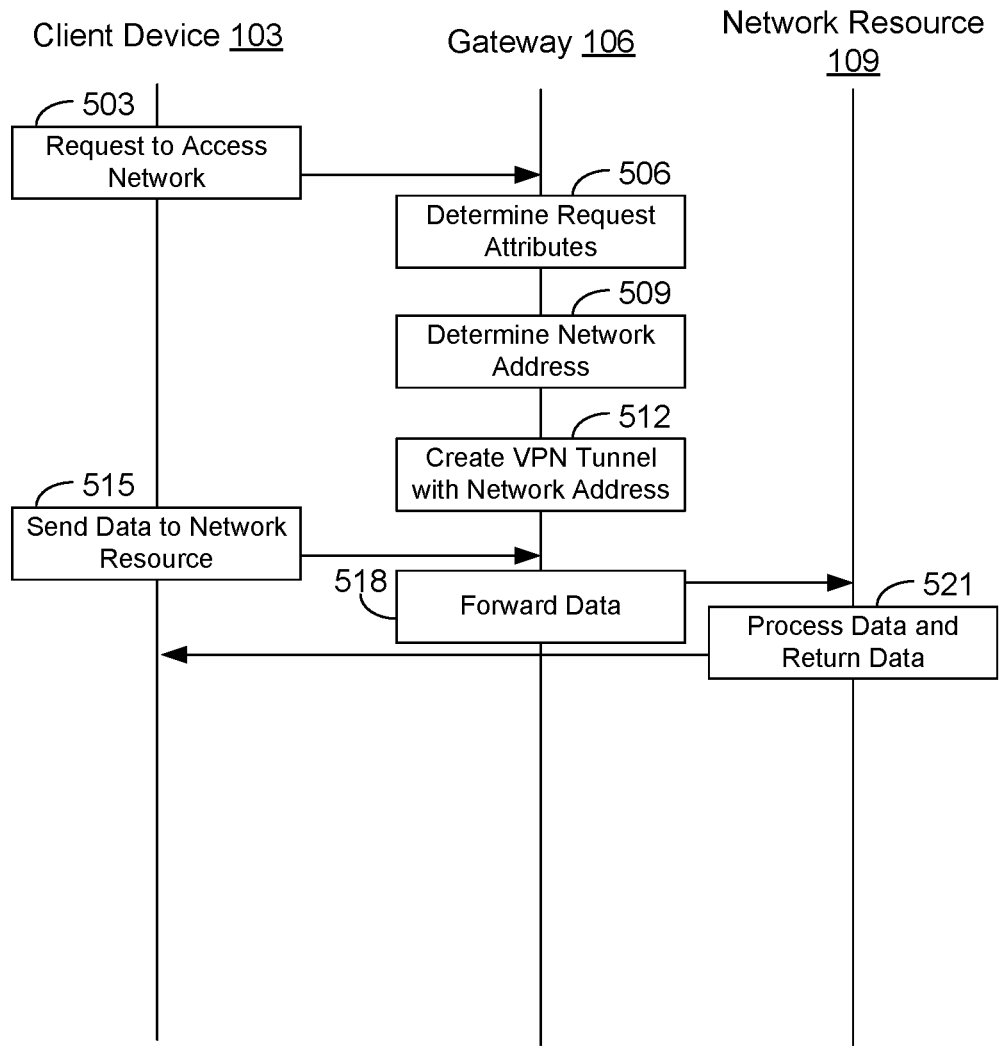

Turning now to FIG. 5, shown is a sequence diagram 500 illustrating one example of interaction between a client device 103, a gateway 106, and a network resource 109. Functionality attributed to each of the client device 103, the gateway 106, and the network resource 109 can be implemented in fewer processes or application or in additional processes or applications. The separation or segmentation of functionality as discussed herein is presented for illustrative purposes only.

Beginning with step 503, a client application 136 on a client device 103 requests to access a network resource 109 of the internal network 118. This request is sent from the client device 103 over the external network 121 to the gateway 106. At step 506, the gateway 106 determines attributes of the request such as, for example, application identifier, device identifier, user identifier, application version, operating system version, device location, jailbreak status, and other MDM attributes. At step 509, the gateway 106 determines a network address based on the client application 136 and/or one or more MDM attributes in order to provide access to a set of network resources 109 of a security group. For example, the gateway 106 can assign an IP address of "10.12.137.1" in order to access a particular set of network resources 109 for customer service representatives employed by the organization.

At step 512, the gateway 106 creates a VPN tunnel endpoint 125 having the network address. In some cases, a particular network address can be shared by several VPN tunnels. This can involve port address translation, where separate tunnels are assigned different port numbers with a single network address. At step 515, the client application 136 on the client device 103 sends data to a particular network resource 109. This data can be sent through a per-application VPN tunnel over the external network 121 to the VPN tunnel endpoint 125 in the gateway 106.

At step 518, the gateway 106 forwards the data to the network resource 109 over the internal network 118 using the assigned network address. In some cases, the gateway 106 can continually reevaluate the MDM attributes for compliance and forward in response to determining continued compliance. For example, if the location of the client device 103 is updated to an unauthorized location, a different network address can be assigned. Because the data is sent using the particular assigned network address, the routers, firewalls, switches, and/or other devices in the internal network 118 are configured to route the data to the network resource 109. At step 521, the network resource 109 processes the received data and returns other data back to the client device 103 by way of the gateway 106 and the VPN tunnel endpoint 125.

Figure 6:
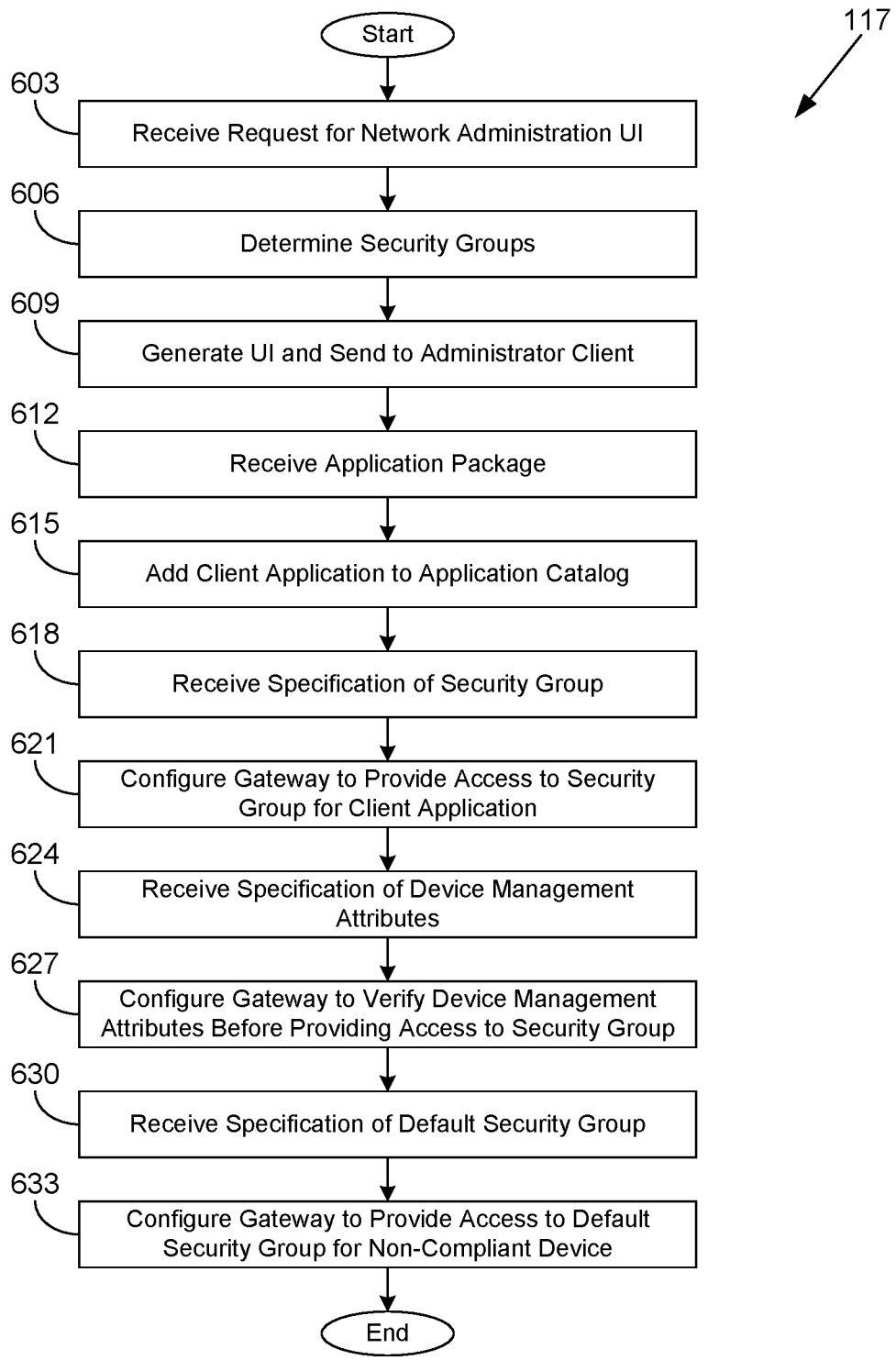
FIGS. 6 and 7 are flowcharts illustrating examples of functionality according to various examples of the present disclosure.

Turning now to FIG. 6, shown is a flowchart that provides one example of the operation of a network administration service 117. Functionality attributed to the network administration service 117 can be implemented in a single process or application or in multiple processes or applications. The separation or segmentation of functionality as discussed herein is presented for illustrative purposes only.

Beginning with step 603, the network administration service 117 receives a request for a network administration user interface from an administrator client device 105. At step 606, the network administration service 117 determines a mapping of security groups to network addresses that are available for the organization. The virtual network segments corresponding to these security groups can be preconfigured in the internal network 118 by the network controller 115. At step 609, the network administration service 117 generates the user interface and sends data encoding the user interface to the administrator client device 105.

At step 612, the network administration service 117 receives an application package uploaded by the administrator client device 105. Alternatively, the network administration service 117 receives a URL specified by the administrator client device 105 and can obtain the application package from another source. At step 615, the network administration service 117 adds the client application 136 to the application catalog of the organization.

At step 618, the network administration service 117 receives a specification of a security group from the administrator client device 105. The security group corresponds to a set of network resources 109 on the internal network 118 that the client application 136 should be permitted to access. The specification can correspond to a selection of one or more security groups from a listing of a plurality of security groups.

At step 621, the network administration service 117 configures the gateway 106 to provide access to the set of network resources 109 of the security group for the client application 136. In this regard, the network administration service 117 can determine a network address meeting predefined criteria that enables network traffic from the network address to be routed to a virtual network segment of the internal network 118, where the set of network resources 109 are accessible though the virtual network segment.

At step 624, the network administration service 117 receives a specification of one or more device management attributes from the administrator client device 105. The attributes can include device location, device identifier, user identifier, jailbreak status, operating system version, application version, and other attributes. The attributes can be required to be present (or absent) in order for a client device 103 to be considered to be in a compliant state. At step 627, the network administration service 117 configures the gateway 106 to verify the presence or compliance status of the attributes before providing a client application 136 with access to the corresponding security group.

At step 630, the network administration service 117 receives a specification of a default security group from the administrator client device 105. The default security group can correspond to a particular network resource 109 or set of network resources 109 for which a client application 136 that is considered non-compliant should have access. For example, if a client device 103 is non-compliant, it can be desirable not to have a network failure in response to the non-compliant status. Thus, the network traffic can failover to a network resource 109 that can provide an error message or error document to inform the end user of the lack of compliance. This can enable the end user to take steps to correct the condition leading to the lack of compliance. For example, a user can be instructed in a document from a default network resource 109 to exit a restricted area before access to a certain document is permitted.

At step 633, the network administration service 117 configures the gateway 106 to provide access to the default security group for non-compliant devices. To this end, the gateway 106 can be configured to assign a network address meeting different predefined criteria in order for the internal network 118 to route the network traffic from the client application 136 to the default network resource 109. Thereafter, the process can proceed to completion.

Figure 7:
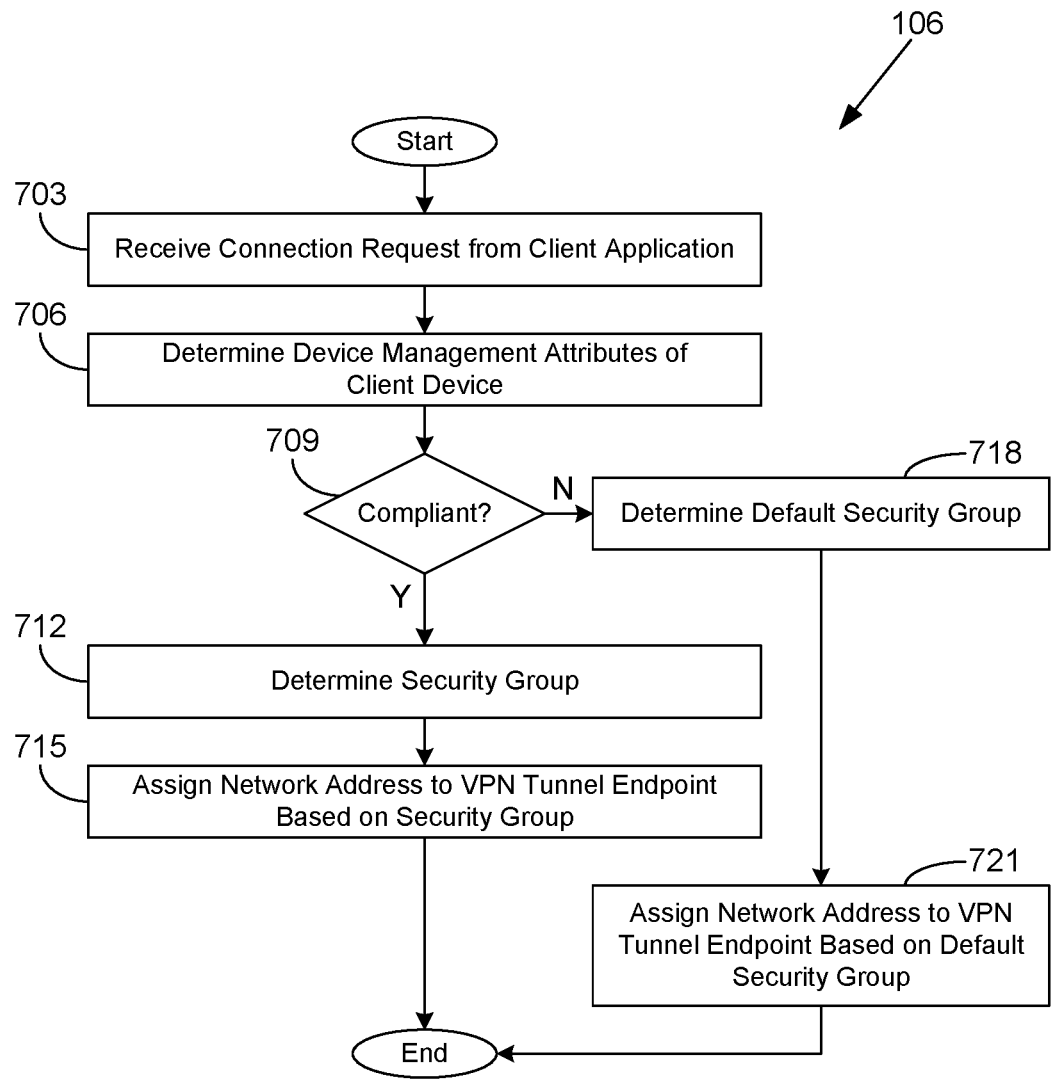

Continuing to FIG. 7, shown is a flowchart that provides one example of the operation of a gateway 106. Functionality attributed to the gateway 106 can be implemented in a single process or application or in multiple processes or applications. The separation or segmentation of functionality as discussed herein is presented for illustrative purposes only.

Beginning with step 703, the gateway 106 receives a connection request from a client application 136 executed by a client device 103. The connection request seeks to connect the client application 136 with one or more network resources 109 on the internal network 118. At step 706, the gateway 106 determines one or more device management characteristics of the client device 103. These characteristics can include user identifier, application identifier, location, device identifier, source IP address, destination IP address, source port number, destination port number, jailbreak status, and other characteristics.

At step 709, the gateway 106 evaluates the device management characteristics to determine whether the client device is associated with a compliant status and should be given access to a virtual network segment that includes the requested network resource 109. A variety of rules can be established in the gateway configuration data store 126 by the network administration service 117. If the client device 103 is compliant and the client application 136 should be permitted access, the gateway 106 continues to box 712 and determines a security group for the client application 136 according to rules in the gateway configuration data store 126. For example, the gateway configuration data store 126 can include a mapping of application identifiers to virtual network segment identifiers. This mapping can also include predefined criteria for assigning a network address such as an IP in order to provide access to the designated security group.

At step 715, the gateway 106 assigns a network address to a virtual private network (VPN) tunnel endpoint 125 for the connection, where the network address is assigned in order to provide access to the designated security group. For example, if a virtual network segment is accessible from an IP address range of "10.12.31.x," an IP address of "10.12.31.2" can be assigned to the VPN tunnel endpoint 125. Thereafter, the process can proceed to completion, and data can be exchanged between the client application 136 and the requested network resource 109.

Otherwise, if at step 709, it is determined that the client device 103 is in a non-compliant state, the gateway 106 can proceed to step 718. At step 718, the gateway 106 determines a default security group to which connections from non-compliant client devices 103 can be routed. At step 721, the gateway 106 assigns a network address to the VPN tunnel endpoint 125 for the connection, where the network address is assigned in order to provide access to the default security group. Thereafter, the process can proceed to completion, and default network resources 109 can be accessed by the client application 136 while the client device 103 is in a non-compliant state.

The flowcharts of FIGS. 6-7 and the sequence diagrams of FIGS. 4-5 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts and sequence diagram show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The client device 103, the administrator client device 105, the gateway 106, the network controller 115, the network administration service 117, the network resources 109, the application catalog service 112, the device management service 104, or other components described herein can include at least one processing circuit. Such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the client device 103, the administrator client device 105, the gateway 106, the network controller 115, the network administration service 117, the network resources 109, the application catalog service 112, the device management service 104, and/or other components can be stored in one or more storage devices and be executable by one or more processors. Also, a data store can be stored in the one or more storage devices.

The client device 103, the administrator client device 105, the gateway 106, the network controller 115, the network administration service 117, the network resources 109, the application catalog service 112, the device management service 104, and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

Therefore, the following is claimed:

1. A non-transitory computer-readable medium embodying at least one program executable in at least one computing device, the at least one program, when executed by the at least one computing device, being configured to cause the at least one computing device to at least:
  receive, at a gateway that connects an external network with an internal network, a connection request from a client application executed by a client device, the connection request comprising a request for a connection to a network resource accessible on the internal network;
  identify a virtual network segment of the internal network associated with a group of resources comprising the network resource, based on a stored mapping of resources to virtual network segment identifiers, wherein the virtual network segment is accessible from a range of network addresses;
  determine one or more device management characteristics for the client device, the one or more device management characteristics comprising a device management characteristic that includes an application identifier;
  determine a compliance status for the client device based on one or more device management characteristics, wherein the compliance status is determined to be non-compliant;
  determine a security group for the client application based on the compliance status, the application identifier, and the identified virtual network segment;
  determine that the security group is a default security group for the client application executed on the client device;
  assign, from the range of network addresses, a network address to a virtual private network (VPN) tunnel endpoint of the gateway for a network connection for the client application executed by the client device;
  determine the network address assigned to the VPN tunnel endpoint for the network connection for the client application based on the security group, wherein the security group has access to a restricted portion of the network resource; and
  configure the gateway to provide access to the security group for client device.

2. The non-transitory computer-readable medium of claim 1, wherein the one or more device management characteristics further comprise at least one of a user identifier, a device identifier, a source Internet Protocol (IP) address, or a destination IP address.

3. The non-transitory computer-readable medium of claim 1, wherein the security group for the client application is determined based on a rule stored in a gateway configuration data store and at least one of the one or more device management characteristics.

4. The non-transitory computer-readable medium of claim 3, wherein the rule comprises a mapping of at least one of the one or more device characteristics to a plurality of virtual network segment identifiers for the security group.

5. A system, comprising:
  a gateway that connects an internal network with an external network comprising at least one computing device; and
  an application executable by the at least one computing device, the application configured to cause the at least one computing device to at least:

receive, at the gateway, a connection request from a client application executed by a client device, the connection request comprising a request for a connection to a network resource accessible on the internal network;

identify a virtual network segment of the internal network associated with a group of resources comprising the network resource, based on a stored mapping of resources to virtual network segment identifiers, wherein the virtual network segment is accessible from a range of network addresses;

determine one or more device management characteristics for the client device, the one or more device management characteristics comprising a device management characteristic that includes an application identifier;

determine a compliance status for the client device based on one or more device management characteristics, wherein the compliance status is determined to be non-compliant;

determine a security group for the client application based on the compliance status, the application identifier, and the identified virtual network segment;

determine that the security group is a default security group for the client application executed on the client device;

assign, from the range of network addresses, a network address to a virtual private network (VPN) tunnel endpoint of the gateway for a network connection for the client application executed by the client device;

determine the network address assigned to the VPN tunnel endpoint for the network connection for the client application based on the security group, wherein the security group has access to a restricted portion of the network resource; and configure the gateway to provide access to the security group for client device.

6. The system of claim 5, wherein the one or more device management characteristics further comprise at least one of a user identifier, a device identifier, a source Internet Protocol (IP) address, or a destination IP address.

7. The system of claim 5, wherein the security group for the client application is determined based on a rule stored in a gateway configuration data store and at least one of the one or more device management characteristic.

8. The system of claim 7, wherein the rule comprises a mapping of at least one of the one or more device characteristic to a plurality of virtual network segment identifiers for the security group.

9. The system of claim 5, wherein the connection request is received from the client application through the external network.

10. A method, comprising:
receiving, at a gateway that connects an external network with an internal network, a connection request from a client application executed by a client device, the connection request comprising a request for a connection to a network resource accessible on the internal network;

identifying a virtual network segment of the internal network associated with a group of resources comprising the network resource, based on a stored mapping of resources to virtual network segment identifiers, wherein the virtual network segment is accessible from a range of network addresses;

determining one or more device management characteristics for the client device, the one or more device management characteristics comprising a device management characteristic that includes an application identifier;

determine a compliance status for the client device based on one or more device management characteristics, wherein the compliance status is determined to be non-compliant;

determining a security group for the client application based on the compliance status, the application identifier, and the identified virtual network segment;

determine that the security group is a default security group for the client application executed on the client device;

assigning, from the range of network addresses, a network address to a virtual private network (VPN) tunnel endpoint of the gateway for a network connection for the client application executed by the client device;

determine the network address assigned to the VPN tunnel endpoint for the network connection for the client application based on the security group, wherein the security group has access to a restricted portion of the network resource; and configure the gateway to provide access to the security group for client device.

11. The method of claim 10, wherein the one or more device management characteristics further comprise at least one of a user identifier, an application identifier, a device identifier, a source Internet Protocol (IP) address, or a destination IP address.

12. The method of claim 10, wherein the security group for the client application is determined based on a rule stored in a gateway configuration data store and at least one of the one or more device management characteristics.

13. The method of claim 12, wherein the rule comprises a mapping of at least one of the one or more device characteristics to a plurality of virtual network segment identifiers for the security group.

14. The method of claim 10, wherein the connection request is received from the client application through the external network.

* * * * *